(12) United States Patent
Urano

(10) Patent No.: US 8,829,727 B2
(45) Date of Patent: *Sep. 9, 2014

(54) WIRELESS POWER FEEDER, WIRELESS POWER TRANSMISSION SYSTEM, AND TABLE AND TABLE LAMP USING THE SAME

(75) Inventor: Takashi Urano, Tokyo (JP)

(73) Assignee: TDK Corporation, Tokyo (JP)

( * ) Notice: Subject to any disclaimer, the term of this patent is extended or adjusted under 35 U.S.C. 154(b) by 632 days.

This patent is subject to a terminal disclaimer.

(21) Appl. No.: 13/096,559

(22) Filed: Apr. 28, 2011

(65) Prior Publication Data

US 2011/0260548 A1     Oct. 27, 2011

Related U.S. Application Data

(63) Continuation-in-part of application No. 12/910,456, filed on Oct. 22, 2010, now Pat. No. 8,581,444.

(30) Foreign Application Priority Data

Oct. 30, 2009  (JP) .................................. 2009-250397
Aug. 25, 2010  (JP) .................................. 2010-187789

(51) Int. Cl.
*H01F 37/00* (2006.01)
*H02J 5/00* (2006.01)
*H05B 37/02* (2006.01)
*H02M 7/5387* (2007.01)

(52) U.S. Cl.
CPC ............ *H02J 5/005* (2013.01); *H02M 7/53871* (2013.01); *H05B 37/02* (2013.01)
USPC ............ 307/104; 307/149; 307/151; 320/108

(58) Field of Classification Search
USPC ............................ 307/104, 149, 151; 320/108
See application file for complete search history.

(56) References Cited

U.S. PATENT DOCUMENTS 7,518,267 B2 *  4/2009  Baarman ........................ 307/150
7,522,878 B2 *  4/2009  Baarman ....................... 455/41.1

(Continued)

FOREIGN PATENT DOCUMENTS

JP          6-54297 U      7/1994
JP       10-225129 A      8/1998

(Continued)

OTHER PUBLICATIONS

US Office Action issued in U.S. Appl. No. 12/910,456 mailed Feb. 15, 2013.

(Continued)

*Primary Examiner* — Jared Fureman
*Assistant Examiner* — Alfonso Perez Borroto
(74) *Attorney, Agent, or Firm* — McDermott Will & Emery LLP

(57) ABSTRACT

Power is fed from a feeding coil L2 to a receiving coil L3 by magnetic resonance. A VCO alternately turns ON/OFF switching transistors Q1 and Q2 at a drive frequency fo, whereby AC current is fed to the feeding coil L2, and then the AC current is fed from the feeding coil L2 to the receiving coil L3. A phase detection circuit detects a phase difference between the current phase and voltage phase, and the VCO adjusts the drive frequency fo such that the phase difference becomes zero. In a current phase detection circuit and a voltage phase detection circuit, detection values of the current and voltage phases can be changed, respectively and intentionally.

14 Claims, 20 Drawing Sheets

(56) References Cited

U.S. PATENT DOCUMENTS

| | | | |
|---|---|---|---|
| 7,741,734 B2 | 6/2010 | Joannopoulos et al. | |
| 8,049,370 B2 | 11/2011 | Azancot et al. | |
| 8,517,126 B2* | 8/2013 | Atarashi | 180/2.1 |
| 8,629,576 B2* | 1/2014 | Levine | 307/104 |
| 2007/0222542 A1 | 9/2007 | Joannopoulos et al. | |
| 2008/0211320 A1 | 9/2008 | Cook et al. | |
| 2008/0278264 A1 | 11/2008 | Karalis et al. | |
| 2009/0015075 A1 | 1/2009 | Cook et al. | |
| 2009/0026844 A1* | 1/2009 | Iisaka et al. | 307/104 |
| 2009/0045772 A1 | 2/2009 | Cook et al. | |
| 2009/0051224 A1* | 2/2009 | Cook et al. | 307/104 |
| 2009/0058189 A1 | 3/2009 | Cook et al. | |
| 2009/0072627 A1 | 3/2009 | Cook et al. | |
| 2009/0072628 A1 | 3/2009 | Cook et al. | |
| 2009/0072629 A1* | 3/2009 | Cook et al. | 307/104 |
| 2009/0079268 A1 | 3/2009 | Cook et al. | |
| 2009/0079269 A1* | 3/2009 | Jin | 307/104 |
| 2009/0102292 A1 | 4/2009 | Cook et al. | |
| 2009/0134712 A1 | 5/2009 | Cook et al. | |
| 2009/0167449 A1 | 7/2009 | Cook et al. | |
| 2009/0179502 A1 | 7/2009 | Cook et al. | |
| 2009/0195332 A1 | 8/2009 | Joannopoulos et al. | |
| 2009/0195333 A1 | 8/2009 | Joannopoulos et al. | |
| 2009/0212636 A1 | 8/2009 | Cook et al. | |
| 2009/0213028 A1 | 8/2009 | Cook et al. | |
| 2009/0224608 A1 | 9/2009 | Cook et al. | |
| 2009/0224609 A1* | 9/2009 | Cook et al. | 307/104 |
| 2009/0224856 A1 | 9/2009 | Karalis et al. | |
| 2009/0243397 A1 | 10/2009 | Cook et al. | |
| 2009/0267709 A1 | 10/2009 | Joannopoulos et al. | |
| 2009/0267710 A1 | 10/2009 | Joannopoulos et al. | |
| 2009/0273242 A1 | 11/2009 | Cook | |
| 2009/0284083 A1 | 11/2009 | Karalis et al. | |
| 2010/0007307 A1 | 1/2010 | Baarman et al. | |
| 2010/0038970 A1 | 2/2010 | Cook et al. | |
| 2010/0065352 A1* | 3/2010 | Ichikawa | 180/65.8 |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133917 A1* | 6/2010 | Sekino et al. | 307/104 |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0141042 A1 | 6/2010 | Kesler et al. | |
| 2010/0148589 A1 | 6/2010 | Hamam et al. | |
| 2010/0201201 A1 | 8/2010 | Mobarhan et al. | |
| 2010/0225271 A1 | 9/2010 | Oyobe et al. | |
| 2011/0121778 A1 | 5/2011 | Oyobe et al. | |
| 2011/0222651 A1 | 9/2011 | Ogawa et al. | |
| 2012/0032525 A1 | 2/2012 | Oyobe et al. | |

FOREIGN PATENT DOCUMENTS

| | | |
|---|---|---|
| JP | 2005-006396 A | 1/2005 |
| JP | 2005-110412 | 4/2005 |
| JP | 2006-074848 A | 3/2006 |
| JP | 2006-230032 | 8/2006 |
| JP | 2008-172872 | 7/2008 |
| JP | 2009-106136 A | 5/2009 |
| WO | WO 2006/022365 A1 | 3/2006 |
| WO | 2008-029445 A1 | 3/2008 |

OTHER PUBLICATIONS

Fu et al., "Study on Frequency-tracking Wireless Power Transfer System by Resonant Coupling", The World of Inventors, Aug. 2009, pp. 46-46.

Translation of Chinese Office Action issued in Chinese Application No. 201010534137.7 mailed Dec. 19, 2012.

Translation of Chinese Search Report issued in Chinese Application No. 201010534137.7 mailed Dec. 12, 2012.

Fu et al., "Study on Frequency-tracking Wireless Power Transfer System by Resonant Coupling", Power Electronics and Motion Control Conference, 2009. IPEMC '09. IEEE 6th International, May 17-20, 2009, pp. 2658-2663.

European Search Report issued in European Patent Application No. 10014084.7-2207, mailed Feb. 14, 2011.

Fu, W., et al., "Study on Frequency-tracking Wireless Power Transfer System by Resonant Coupling", Power Electronics and Motion Control Conference, May 2009, pp. 2658-2663.

Chan, T-S, et al., "LLC Resonant Converter for Wireless Energy Transmission System with PLL Control", Sustainable Energy Technologies, Nov. 2008, pp. 136-139.

* cited by examiner

WIRELESS POWER FEEDER, WIRELESS POWER TRANSMISSION SYSTEM, AND TABLE AND TABLE LAMP USING THE SAME

This is a continuation-in-part of application Ser. No. 12/910,456, filed on Oct. 22, 2010 now U.S. Pat. No. 8,581,444.

BACKGROUND OF THE INVENTION

1. Field of the Invention

The present invention relates to a wireless AC power feeding and, more particularly, to power control thereof.

2. Description of Related Art

A wireless power feeding technique of feeding power without a power cord is now attracting attention. The current wireless power feeding technique is roughly divided into three: (A) type utilizing electromagnetic induction (for short range); (B) type utilizing radio wave (for long range); and (C) type utilizing resonance phenomenon of magnetic field (for intermediate range).

The type (A) utilizing electromagnetic induction has generally been employed in familiar home appliances such as an electric shaver; however, it can be effective only in a short range of several centimeters. The type (B) utilizing radio wave is available in a long range; however, it cannot feed big electric power. The type (C) utilizing resonance phenomenon is a comparatively new technique and is of particular interest because of its high power transmission efficiency even in an intermediate range of about several meters. For example, a plan is being studied in which a receiving coil is buried in a lower portion of an EV (Electric Vehicle) so as to feed power from a feeding coil in the ground in a non-contact manner. The wireless configuration allows a completely insulated system to be achieved, which is especially effective for power feeding in the rain. Hereinafter, the type (C) is referred to as "magnetic field resonance type".

The magnetic field resonance type is based on a theory published by Massachusetts Institute of Technology in 2006 (refer to Patent Document 1). In Patent Document 1, four coils are prepared. The four coils are referred to as "exciting coil", "feeding coil", "receiving coil", and "loading coil" in the order starting from the feeding side. The exciting coil and feeding coil closely face each other for electromagnetic coupling. Similarly, the receiving coil and loading coil closely face each other for electromagnetic coupling. The distance (intermediate distance) between the feeding coil and receiving coil is larger than the distance between the exciting coil and feeding coil and distance between the receiving coil and loading coil. This system aims to feed power from the feeding coil to receiving coil.

When AC power is fed to the exciting coil, current also flows in the feeding coil according to the principle of electromagnetic induction. When the feeding coil generates a magnetic field to cause the feeding coil and receiving coil to magnetically resonate, large current flows in the receiving coil. At this time, current also flows in the loading coil according to the principle of electromagnetic induction, and power is taken out from a load connected in series to the loading coil. By utilizing the magnetic field resonance phenomenon, high power transmission efficiency can be achieved even if the feeding coil and receiving coil are largely spaced from each other.

CITATION LIST

Patent Document

[Patent Document 1] U.S. Pat. Appln. Publication No. 2008/0278246

[Patent Document 2] Jpn. Pat. Appln. Laid-Open Publication No. 2006-230032

[Patent Document 3] International Publication Pamphlet No. WO2006/022365

[Patent Document 4] U.S. Pat. Appln. Publication No. 2009/0072629

[Patent Document 5] U.S. Pat. Appln. Publication No. 2009/0015075

[Patent Document 6] Jpn. Pat. Appln. Laid-Open Publication No. 2008-172872

The present inventor considers that a mechanism for controlling the magnitude of transmission power is required in order to extend the applicability of wireless power feeding. However, in the present situation, there has been no such an approach.

In the technique disclosed in Patent Document 2, a DC power supply V1 is used as an input voltage supply to generate transmission power. Although not described in Patent Document 2, it can be considered possible to control the magnitude of transmission power by controlling input voltage using a DC/DC converter. However, in general, power loss of about 10 to 20% occurs in the DC/DC converter. Further, the use of the DC/DC converter is not favorable in terms of cost.

SUMMARY

A main object of the present invention is to effectively control transmission power in wireless power feeding of a magnetic field resonance type.

A wireless power feeder according to the present invention is a device for feeding power by wireless from a feeding coil to a receiving coil at the resonance frequency of the feeding coil and the receiving coil. The wireless power feeder comprises: the feeding coil; a power transmission control circuit that feeds AC power to the feeding coil; and a phase detection circuit that detects a phase difference between the voltage phase and current phase of the AC power. The power transmission control circuit adjusts the drive frequency of the AC power such that the phase difference is reduced. A detected phase value of both or one of the voltage and current phases can be changed intentionally in the phase detection circuit.

When the drive frequency of the power transmission control circuit and resonance frequency are made coincide with each other, the power transmission efficiency in the entire system can be enhanced. The current and voltage phases of the AC power are compared to detect the phase difference between them, and the drive frequency is adjusted so as to reduce the detected phase difference, whereby it is possible to allow the drive frequency to track the resonance frequency. As a result, it makes easier for the power transmission efficiency to be kept at a high level.

Further, when the detection value of the voltage or current phase is intentionally changed, the power transmission control circuit determines that the phase difference occurs even though the resonance state is actually maintained. The power transmission control circuit automatically adjusts the drive frequency based on the phase difference. Accordingly, the drive frequency and resonance frequency becomes non-coincident with each other to reduce the power transmission efficiency. As a result, it is possible to realize wireless power feeding capable of easily achieving manual control of the power transmission efficiency while automatically pursuing the maximum power transmission efficiency.

The phase detection circuit may compare a first phase value indicating a timing at which the voltage level of the AC power becomes a first reference value and a second phase value indicating a timing at which the current level of the AC power becomes a second reference value to detect the phase difference. By changing both or one of the first and second reference values, both or one of the first and second phase values may be changed.

The phase detection circuit may convert both or one of voltage and current components of the AC power into a signal having a saw-tooth waveform for detection of the phase difference. The wireless power feeder may further include an exciting coil that is magnetically coupled to the feeding coil and feeds AC power fed from the power transmission control circuit to the feeding coil. The power transmission control circuit may include first and second current paths and make first and second switches connected in series respectively to the first and second current paths alternately conductive to feed the AC power to the exciting coil.

The wireless power feeder may further include a detection coil that generates inductive current using a magnetic field generated by the AC current. The phase detection circuit may measure the phase of the inductive current flowing in the detection coil to achieve measurement of the current phase of the AC power. Since the current phase is measured from the inductive current flowing in the detection coil, a measurement load is hardly applied to the feeding coil in direct. The detection coil may generate the inductive current using a magnetic field generated by the AC power flowing in the feeding coil.

The power transmission control circuit may make the feeding coil that does not substantially resonate with circuit elements on the power feeding side feed the AC power to the receiving coil. The "substantially does not resonate" mentioned here means that the resonance of the feeding coil is not essential for the wireless power feeding, but does not mean that even an accidental resonance of the feeding coil with some circuit element is eliminated. A configuration may be possible in which the feeding coil does not form, together with power feeding side circuit elements, a resonance circuit that resonates with at a resonance point corresponding to the resonance frequency of the receiving coil. Further, a configuration may be possible in which no capacitor is inserted in series or in parallel to the feeding coil.

The feeding coil may be connected to a capacitor and form a circuit which resonates at a resonance frequency of the receiving coil.

A wireless power transmission system according to the present invention includes: the abovementioned wireless power feeder; the receiving coil; and a loading coil that is magnetically coupled to the receiving coil and receives power that the receiving coil has received from the feeding coil.

The receiving coil may be connected to a capacitor and form a circuit which resonates at a resonance frequency of the feeding coil.

A table with wireless power feeding function according to the present invention may include the abovementioned wireless power feeder. The feeding coil is provided on the rear surface of the table or incorporated inside the table. According to such an embodiment, it is possible to add a wireless power feeding function to the table while maintaining the outer appearance of a commonly-used table.

A table lamp with wireless power receiving function according to the present invention receives, using a receiving coil, AC power transmitted from the abovementioned table by wireless. The table lamp includes: a receiving coil circuit that includes the receiving coil and a capacitor; and a loading circuit that includes a loading coil that is magnetically coupled to the receiving coil to receive the AC power from the receiving coil and a lamp that receives power from the loading coil. When the table lamp is placed on the table, the receiving coil receives the AC power fed from the feeding coil provided in the table to turn on the lamp. This configuration eliminated the need of providing a power cord, thus being advantageous in terms of appearance and safety.

It is to be noted that any arbitrary combination of the above-described structural components and expressions changed between a method, an apparatus, a system, etc. are all effective as and encompassed by the present embodiments.

According to the present invention, it is possible to easily perform control of transmission power in wireless power feeding of a magnetic field resonance type.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE EMBODIMENTS

A preferred embodiment of the present invention will be described below with reference to the accompanying drawings.

[First Embodiment]

Figure 1:
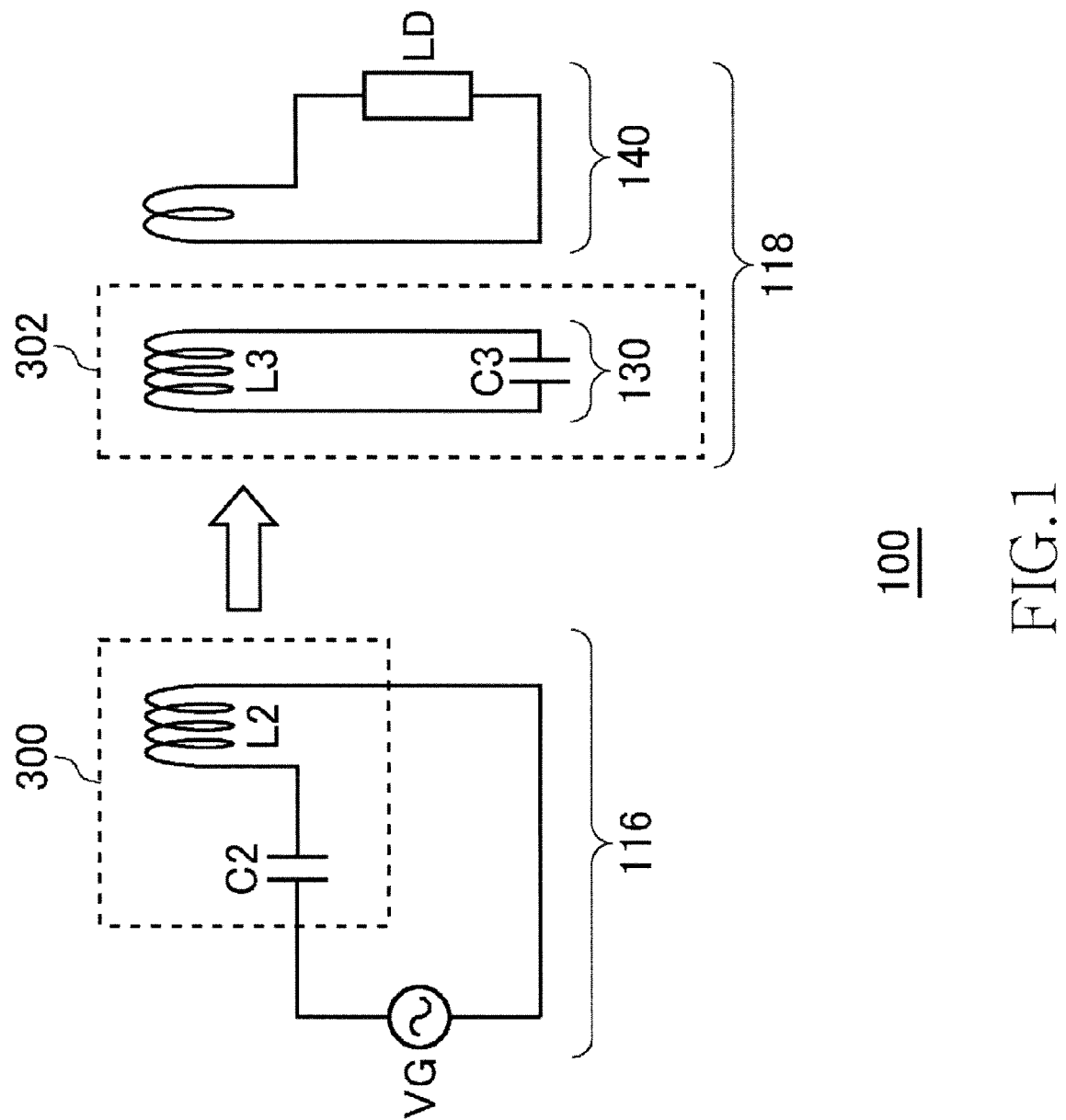
FIG. 1 is a principle view of a wireless power transmission system according to a first embodiment of the present invention.

FIG. 1 is a view illustrating operation principle of a wireless power transmission system 100 according to the first embodiment. The wireless power transmission system 100 in the first embodiment includes a wireless power feeder 116 and a wireless power receiver 118. The wireless power feeder 116 includes a power feeding LC resonance circuit 300. The wireless power receiver 118 includes a receiving coil circuit 130 and a loading circuit 140. A power receiving LC resonance circuit 302 is formed by the receiving coil circuit 130.

The power feeding LC resonance circuit 300 includes a capacitor C2 and a feeding coil L2. The power receiving LC resonance circuit 302 includes a capacitor C3 and a receiving coil L3. The values of the capacitor C2, feeding coil L2, capacitor C3, and receiving coil L3 are set such that the resonance frequencies of the feeding LC resonance circuit 300 and receiving LC resonance circuit 302 coincide with each other in a state where the feeding coil L2 and receiving coil L3 are disposed away from each other far enough to ignore the magnetic field coupling therebetween. This common resonance frequency is assumed to be fr0.

In a state where the feeding coil L2 and receiving coil L3 are brought close to each other in such a degree that they can be magnetic-field-coupled to each other, a new resonance circuit is formed by the power feeding LC resonance circuit 300, power receiving LC resonance circuit 302, and mutual inductance generated between them. The new resonance circuit has two resonance frequencies fr1 and fr2 (fr1<fr0<fr2) due to the influence of the mutual inductance. When the wireless power feeder 116 supplies AC power from a power feeding source VG to the power feeding LC resonance circuit 300 at the resonance frequency fr1, the power feeding LC resonance circuit 300 constituting apart of the new resonance circuit resonates at a resonance point 1 (resonance frequency fr1). When the power feeding LC resonance circuit 300 resonates, the feeding coil L2 generates an AC magnetic field of the resonance frequency fr1. The power receiving LC resonance circuit 302 constituting apart of the new resonance circuit also resonates by receiving the AC magnetic field. When the power feeding LC resonance circuit 300 and power receiving LC resonance circuit 302 resonate at the same resonance frequency fr1, wireless power feeding from the feeding coil L2 to receiving coil L3 is performed with the maximum power transmission efficiency. Received power is taken from a load LD of the wireless power receiver 118 as output power. Note that the new resonance circuit can resonate not only at the resonance point 1 (resonance frequency fr1) but also at a resonance point 2 (resonance frequency fr2).

The wireless power feeder 116 based on this principle does not include an exciting circuit 110. In case of including the exciting circuit 110, the principle of a wireless feeding is basically the same. It will be described later related with FIG. 18 and the like in case of not including the exciting circuit 110.

Figure 2:
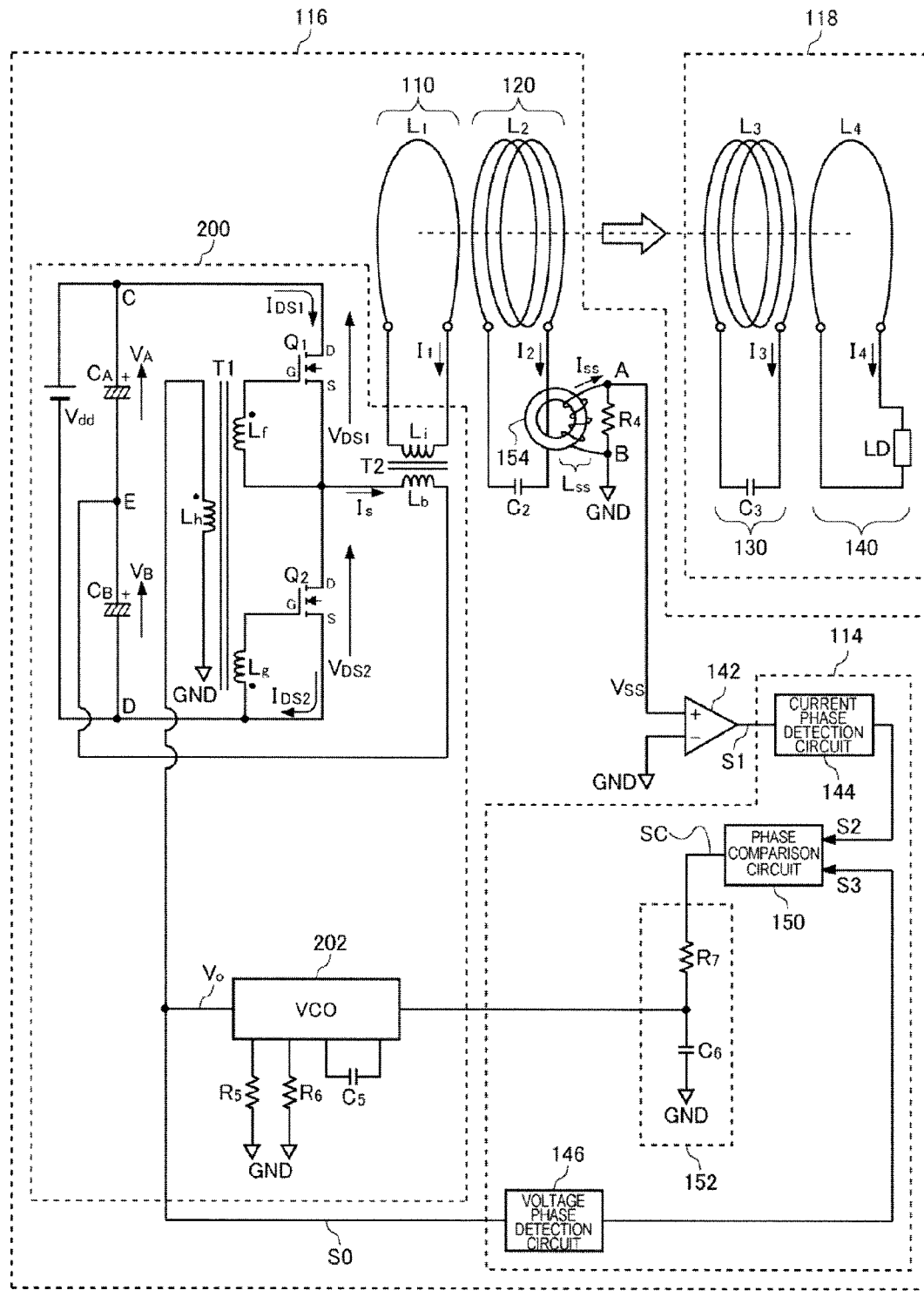
FIG. 2 is a system configuration view of a wireless power transmission system according to a first embodiment of the present invention.

FIG. 2 is a system configuration view of a wireless power transmission system 100 according to the first embodiment. The wireless power transmission system 100 includes a wireless power feeder 116 and a wireless power receiver 118. The wireless power feeder 116 includes, as basic components, a power transmission control circuit 200, an exciting circuit 110, a feeding coil circuit 120, and phase detection circuit 114. The wireless power receiver 118 includes a receiving coil circuit 130, and a loading circuit 140.

A distance of about 0.2 to 1.0 m is provided between a feeding coil L2 of the feeding coil circuit 120 and a receiving coil L3 of the receiving coil circuit 130. The wireless power transmission system 100 mainly aims to feed AC power from the feeding coil L2 to receiving coil L3 by wireless. The wireless power transmission system 100 according to the present embodiment is assumed to operate at a resonance frequency fr1 of 100 kHz or less. In the present embodiment, a resonance frequency fr1 is set to 40 kHz. Note that the wireless power transmission system 100 according to the present embodiment can operate in a high-frequency band such as ISM (Industry-Science-Medical) frequency band.

The exciting circuit 110 is a circuit in which an exciting coil L1 and a transformer T2 secondary coil Li are connected in series. The transformer T2 secondary coil Li constitutes a coupling transformer T2 together with a transformer T2 primary coil Lb and receives AC power from the power transmission control circuit 200 by electromagnetic induction. The number of windings of the exciting coil L1 is 1, diameter of a conductive wire is 5 mm, and shape of the exciting coil L1 itself is a square of 210 mm×210 mm. In FIG. 2, the exciting coil L1 is represented by a circle for clarification. Other coils are also represented by circles for the same reason. All the coils illustrated in FIG. 2 are made of copper. Current I1 flowing in the exciting circuit 110 is AC.

The feeding coil circuit 120 is a circuit in which a feeding coil L2 and a capacitor C2 are connected in series. The exciting coil L1 and feeding coil L2 face each other. The distance between the exciting coil L1 and feeding coil L2 is as comparatively small as 10 mm or less. Thus, the exciting coil L1 and feeding coil L2 are electromagnetically strongly coupled to each other. The number of windings of the feeding coil L2 is 7, diameter of a conductive wire is 5 mm, and shape of the feeding coil L2 itself is a square of 280 mm×280 mm. When the AC current I1 is made to flow in the exciting coil L1, an electromotive force occurs in the feeding coil L2 according to the principle of electromagnetic induction to cause AC current I2 to flow in the feeding coil circuit 120. The AC current I2 is considerably larger than the AC current I1. The values of the feeding coil L2 and capacitor C2 are set such that the resonance frequency fr1 is 40 kHz.

The receiving coil circuit 130 is a circuit in which a receiving coil L3 and a capacitor C3 are connected in series. The feeding coil L2 and receiving coil L3 face each other. The number of windings of the feeding coil L3 is 7, diameter of a conductive wire is 5 mm, and shape of the feeding coil L3 itself is a square of 280 mm×280 mm. The values of the receiving coil L3 and capacitor C3 are set such that the resonance frequency fr1 is also 40 kHz. Thus, the feeding coil L2 and receiving coil L3 need not have the same shape. When the feeding coil L2 generates a magnetic field at the resonance frequency fr1=40 kHz, the feeding coil L2 and receiving coil L3 magnetically resonate, causing large current I3 to flow in the receiving coil circuit 130.

The loading circuit 140 is a circuit in which a loading coil L4 and a load LD are connected in series. The receiving coil L3 and loading coil L4 face each other. The distance between the receiving coil L3 and loading coil L4 is as comparatively small as about 10 mm or less. Thus, the receiving coil L3 and loading coil L4 are electromagnetically strongly coupled to each other. The number of windings of the loading coil L4 is 1, diameter of a conductive wire is 5 mm, and shape of the loading coil L4 itself is a square of 300 mm×300 mm. When the current I3 is made to flow in the receiving coil L3, an electromotive force occurs in the loading circuit 140 to cause current I4 to flow in the loading circuit 140. The AC power fed from the feeding coil L2 of the wireless power feeder 116 is received by the receiving coil L3 of the wireless power receiver 118 and taken from the load LD.

If the load LD is connected in series to the receiving coil circuit 130, the Q-value of the receiving coil circuit 130 is degraded. Therefore, the receiving coil circuit 130 for power reception and loading circuit 140 for power extraction are separated from each other. In order to enhance the power transmission efficiency, the center lines of the feeding coil L2, receiving coil L3, and loading coil L4 are preferably made to coincide with one another.

A configuration of the power transmission control circuit 200 will be described. A VCO (Voltage Controlled Oscillator) 202 is connected to the primary side of the gate-drive transformer T1. The VCO 202 functions as an "oscillator" that generates AC voltage Vo at the drive frequency fo. Although the waveform of the AC voltage Vo may be a sine wave, it is assumed here that the voltage waveform is a rectangular wave. The AC voltage Vo causes current to flow in a transformer T1 primary coil Lh alternately in both positive and negative directions. A transformer T1 primary coil Lh, a transformer T1 secondary coil Lf, and a transformer T1 secondary coil Lg constitute a gate-drive coupling transformer T1. Electromagnetic induction causes current to flow also in the transformer T1 secondary coil Lf and transformer T1 secondary coil Lg alternately in both positive and negative directions.

As the VCO 202 in the present embodiment, a built-in unit (product serial number MC14046B) manufactured by Motorola, Inc is used. The VCO 202 also has a function of dynamically changing the drive frequency fo based on phase difference indicating voltage SC fed from the phase comparison circuit 150. Although the details will be described later, the VCO 202 also functions as a "drive frequency tracking circuit".

An 11th pin and a 12th pin of the VCO 202 are connected to the ground through a resistor R5 and resistor R6, respectively. Further, a 6th pin and a 7th pin of the VCO 202 are connected to each other through a capacitor C5. By adequately setting the values of the resistors R5, R6, and capacitor C5, it is possible to adjust the changeable range of the drive frequency fo. The drive frequency fo in the present embodiment is assumed to be adjusted in a range of 30 to 55 kHz. The adequate range of the phase difference indicating voltage SC is 1.0 to 4.0 (V). The higher the phase difference indicating voltage SC is, the higher the drive frequency fo becomes. The relationship between the phase difference indicating voltage SC and drive frequency fo will be described later using FIG. 7.

Capacitors CA and CB charged by a DC power supply Vdd each serve as a power supply for the power transmission control circuit 200. The capacitor CA is provided between points C and E of FIG. 2, and capacitor CB is provided between points E and D. Assuming that the voltage (voltage between points C and E) of the capacitor CA is VA, voltage (voltage between points E and D) of the capacitor CB is VB, VA+VB (voltage between points C and D) represents input voltage. That is, the capacitors CA and CB each function as a DC voltage supply.

One end of the transformer T1 secondary coil Lf is connected to the gate of a switching transistor Q1, and the other end of the transformer T1 secondary coil Lf is connected to the source of a switching transistor Q1. One end of the transformer T1 secondary coil Lg is connected to the gate of a switching transistor Q2, and the other end of the transformer T1 secondary coil Lg is connected to the source of a switching transistor Q2. When VCO 202 generates AC voltage Vo at drive frequency fo, voltage Vx (Vx>0) is alternately applied, at drive frequency fo, to the gates of the switching transistors Q1 and Q2. As a result, the switching transistors Q1 and Q2 are alternately turned on/off at the drive frequency fo. The switching transistors Q1 and Q2 are enhancement type MOSFET (Metal Oxide Semiconductor Field effect transistor) having the same characteristics but may be other transistors such as a bipolar transistor. Further, other switches such as a relay switch may be used in place of the transistor.

The drain of the switching transistor Q1 is connected to the positive electrode of the capacitor CA. The negative electrode of the capacitor CA is connected to the source of the switching transistor Q1 through the transformer T2 primary coil Lb. The source of the switching transistor Q2 is connected to the negative electrode of the capacitor CB. The positive electrode of the capacitor CB is connected to the drain of the switching transistor Q2 through the transformer T2 primary coil Lb.

Voltage between the source and drain of the switching transistor Q1 is referred to as source-drain voltage VDS1, and voltage between the source and drain of the switching transistor Q2 is referred to as source-drain voltage VDS2. Current flowing between the source and drain of the switching transistor Q1 is referred to as source-drain current IDSL, and current flowing between the source and drain of the switching transistor Q2 is referred to as source-drain current IDS2. The directions of arrows in the diagram indicate the positive directions, and directions opposite to the directions of the arrows indicate the negative directions.

When the switching transistor Q1 is turned conductive (ON), the switching transistor Q2 is turned non-conductive (OFF). A main current path (hereinafter, referred to as "first current path") at this time extends from the positive electrode of the capacitor CA, passes through the point C, switching transistor Q1, transformer T2 primary coil Lb, and point E in this order, and returns to the negative electrode of the capacitor CA. The switching transistor Q1 functions as a switch for controlling conduction/non-conduction of the first current path.

When the switching transistor Q2 is turned conductive (ON), the switching transistor Q1 is turned non-conductive (OFF). A main current path (hereinafter, referred to as "second current path") at this time extends from the positive electrode of the capacitor CB, passes through the point E, transformer T2 primary coil Lb, switching transistor Q2, and point D in this order, and returns to the negative electrode of the capacitor CB. The switching transistor Q2 functions as a switch for controlling conduction/non-conduction of the second current path.

Current flowing in the transformer T2 primary coil Lb in the power transmission control circuit 200 is referred to as "current IS". The current IS is AC current, and the current flow in a first current path is defined as the positive direction and current flow in a second current path is defined as the negative direction.

When the VCO 202 feeds the AC voltage Vo at the drive frequency fo equal to the resonance frequency fr1, the first and second current paths are switched at the resonance frequency fr1. Since the AC current IS of the resonance frequency fr1 flows in the transformer T2 primary coil Lb, the AC current I1 flows in the exciting circuit 110 at the resonance frequency fr1, and the AC current I2 of the resonance frequency fr1 flows in the feeding coil circuit 120. Thus, the feeding coil L2 and capacitor C2 of the feeding coil circuit 120 are in a resonance state. The receiving coil circuit 130 is also a resonance circuit of the resonance frequency fr1, so that the feeding coil L2 and receiving coil L3 magnetically resonate. At this time, the maximum transmission efficiency can be obtained.

The resonance frequency fr1 slightly changes depending on use condition or use environment of the feeding coil circuit 120 or receiving coil circuit 130. Further, in the case where the feeding coil circuit 120 or receiving coil circuit 130 is replaced with new one, the resonance frequency fr1 changes. Alternatively, there may be case where the resonance frequency fr1 needs to be changed aggressively by setting the electrostatic capacitance of the capacitor C2 or capacitor C3 variable. Further, according to the experiment made by the present inventor, it has been found that the resonance frequency fr1 starts falling when the distance between the feeding coil L2 and receiving coil L3 is made smaller to some extent.

The wireless power transmission system 100 in the present embodiment can allow the drive frequency fo to automatically track the resonance frequency fr1. To this end, the phase detection circuit 114 for generating the phase difference indicating voltage SC is provided. The phase detection circuit 114 includes a current phase detection circuit 144, a voltage phase detection circuit 146, a phase comparison circuit 150, and a low-pass filter 152. As the phase comparison circuit 150 in the present embodiment, a built-in unit (Phase Comparator) (product serial number MC14046B) manufactured by Motorola is used, as in the case of the VCO 202. Thus, the phase comparison circuit 150 and VCO 202 can be implemented in one chip.

The current phase detection circuit 144 measures the current phase from a detection coil LSS (to be described later) and generates an S2 signal indicating a phase value thereof. The voltage phase detection circuit 146 measures the voltage phase from the AC voltage Vo and generates an S3 signal indicating a phase value thereof. The phase comparison circuit 150 detects a deviation (phase difference) between the current phase and voltage phase based on the S2 and S3 signals and generates the phase difference indicating voltage SC indicating the magnitude of the phase difference. When the resonance frequency fr1 and drive frequency fo coincide with each other, the phase difference is zero. Thus, by detecting the phase difference, the magnitude of the deviation between the resonance frequency fr1 and drive frequency fo can be detected. Circuit configurations of the current phase detection circuit 144 and the voltage phase detection circuit 146 will be described in detail later using FIGS. 8 and 9, and a relationship between the S2 and S3 signals will be described in detail later using FIGS. 10 to 12.

A resistor may be connected in parallel to both ends of the transformer T1 primary coil Lh to divide the AC voltage Vo for input to the voltage phase detection circuit 146. Even in the case where the AC voltage Vo generated by the VCO 202 is high, the AC voltage Vo can be reduced to a manageable level by the voltage division. The voltage phase may be measured from source-drain voltage VDS1, source-drain voltage VDS2, source-gate voltage VGS1, or source-gate voltage VGS2.

A detection coil LSS is provided near the feeding coil L2. The detection coil LSS is a coil wound around a core 154 (toroidal core) having a penetration hole NS times. The core 154 is formed of a known material such as ferrite, silicon steel, or permalloy. The number of windings NS of the detection coil LSS in the present embodiment is 100.

A part of the current path of the feeding coil circuit 120 penetrates the penetration hole of the core 154. This means that the number of windings NP of the feeding coil circuit 120 with respect to the core 154 is one. With the above configuration, the detection coil LSS and feeding coil L2 constitute a coupling transformer. An AC magnetic field generated by the AC current I2 of the feeding coil L2 causes inductive current ISS having the same phase as that of the current I2 to flow in the detection coil LSS. The magnitude of the inductive current ISS is represented by I2·(NP/NS) according to the law of equal ampere-turn.

A resistor R4 is connected to both ends of the detection coil LSS. One end B of the resistor R4 is grounded, and the other end A thereof is connected to the current phase detection circuit 144 through a comparator 142.

Potential VSS is digitized by the comparator 142 to be an S1 signal. Although details will be described later using FIG. 5, the comparator 142 is an amplifier that outputs a saturated voltage of 3.0 (V) when the potential VSS exceeds a predetermined threshold, e.g., 0.1 (V). Thus, the potential VSS is converted into the S1 signal of a digital waveform by the comparator 142.

The current phase detection circuit 144 adjusts the waveform (digital waveform) of the S1 signal according to a method described later and outputs the S2 signal of a digital waveform. The current phase of AC power is measured from the S2 signal. The current I2 and inductive current ISS have the same phase, and the inductive current ISS and potential VSS (S1 signal, S2 signal) have the same phase. The AC current IS flowing in the power transmission control circuit 200 has the same phase as that of the current I2, so that the current waveform of the AC current IS can be measured by observing the waveform of the S2 signal.

The AC voltage Vo generated by the VCO 202 is input also to the voltage phase detection circuit 146 as an S0 signal. The voltage phase detection circuit 146 adjusts the waveform of the S0 signal according to a method described later and outputs the S3 signal of a digital waveform. The voltage phase of AC power is measured from the S3 signal.

The phase comparison circuit 150 acquires the voltage phase from the S3 signal and current phase from the S2 signal to thereby detect a phase difference td between the voltage phase and current phase. When the drive frequency fo coincides with the resonance frequency fr1, the phase difference td is zero. The phase comparison circuit 150 outputs the phase difference indicating voltage SC in accordance with the phase difference td.

The low-pass filter 152 is connected to the output end of the phase comparison circuit 150. The low-pass filter 152 is a circuit in which a resistor R7 and a capacitor C6 are connected in series and cuts a high-frequency component of the phase difference indicating voltage SC.

The phase difference indicating voltage SC is input to the VCO 202. The VCO 202 changes the drive frequency fo in accordance with the input phase difference indicating voltage SC to thereby allow the drive frequency fo to track the resonance frequency fr1. More specifically, the VCO 202 changes the pulse width of the AC voltage Vo to change the drive frequency fo.

Figure 3:
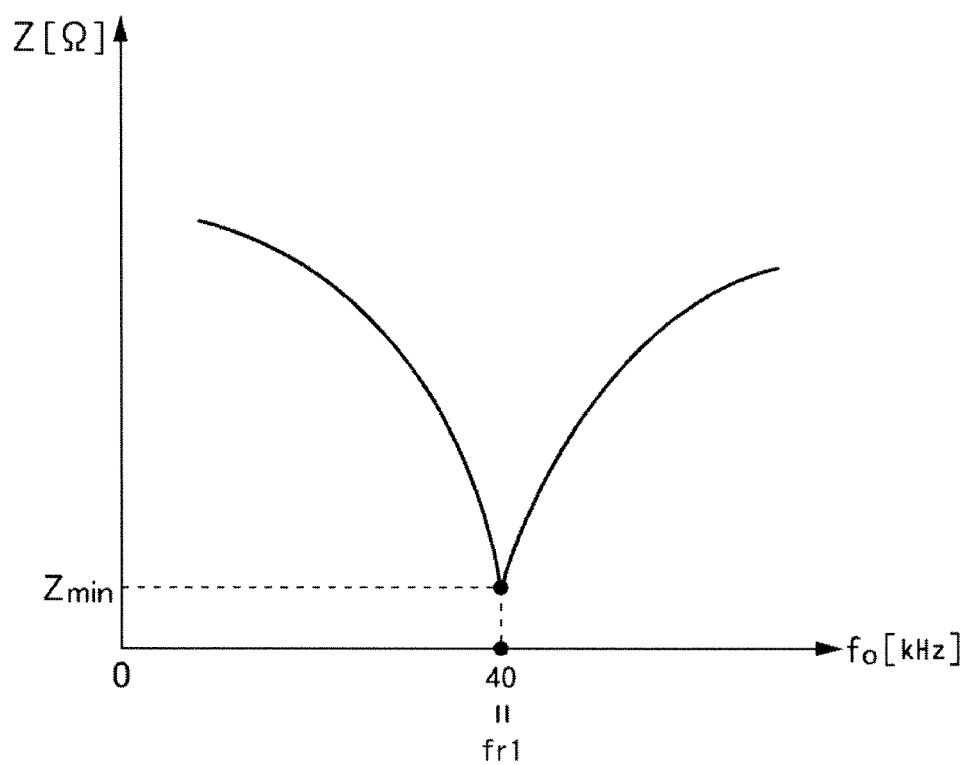
FIG. 3 is a graph illustrating a relationship between impedance of a feeding coil circuit and drive frequency.

FIG. 3 is a graph illustrating a relationship between the impedance Z of the feeding coil circuit 120 and drive frequency fo. The vertical axis represents the impedance Z of the feeding coil circuit 120 (a circuit in which the capacitor C2 and the feeding coil L2 are connected in series). The horizontal axis represents the drive frequency fo. The impedance Z is a minimum value Zmin at the resonance state. Although Zmin=0 at the resonance state is ideal, Zmin does not become zero in general since some resistance components are included in the feeding coil circuit 120.

In FIG. 3, when the drive frequency fo is 40 kHz, that is, when the drive frequency fo and resonance frequency fr1 coincide with each other, the impedance Z becomes minimum and the capacitor C2 and the feeding coil L2 are in a resonance state. When the drive frequency fo and resonance frequency fr1 deviate from each other, one of the capacitive reactance and inductive reactance prevails the other, so that the impedance Z is also increased.

When the drive frequency fo generated by the VCO 202 coincides with the resonance frequency fr1, the AC current I2 flows in the feeding coil L2 at the resonance frequency fr1 and, the AC current I3 also flows in the receiving coil circuit 130 at the resonance frequency fr1. The feeding coil L2, capacitor C2, receiving coil L3, and capacitor C3 resonate at the same resonance frequency fr1, so that the power transmission efficiency from the feeding coil L2 to receiving coil L3 becomes maximum.

When the drive frequency fo and resonance frequency fr1 deviate from each other, the AC current I2 flows in the feeding coil L2 at a non-resonance frequency. As the feeding coil L2 and receiving coil L3 cannot resonate magnetically, the power transmission efficiency is rapidly degraded. At this time, the current phase and voltage phase do not coincide with each other.

Figure 4:
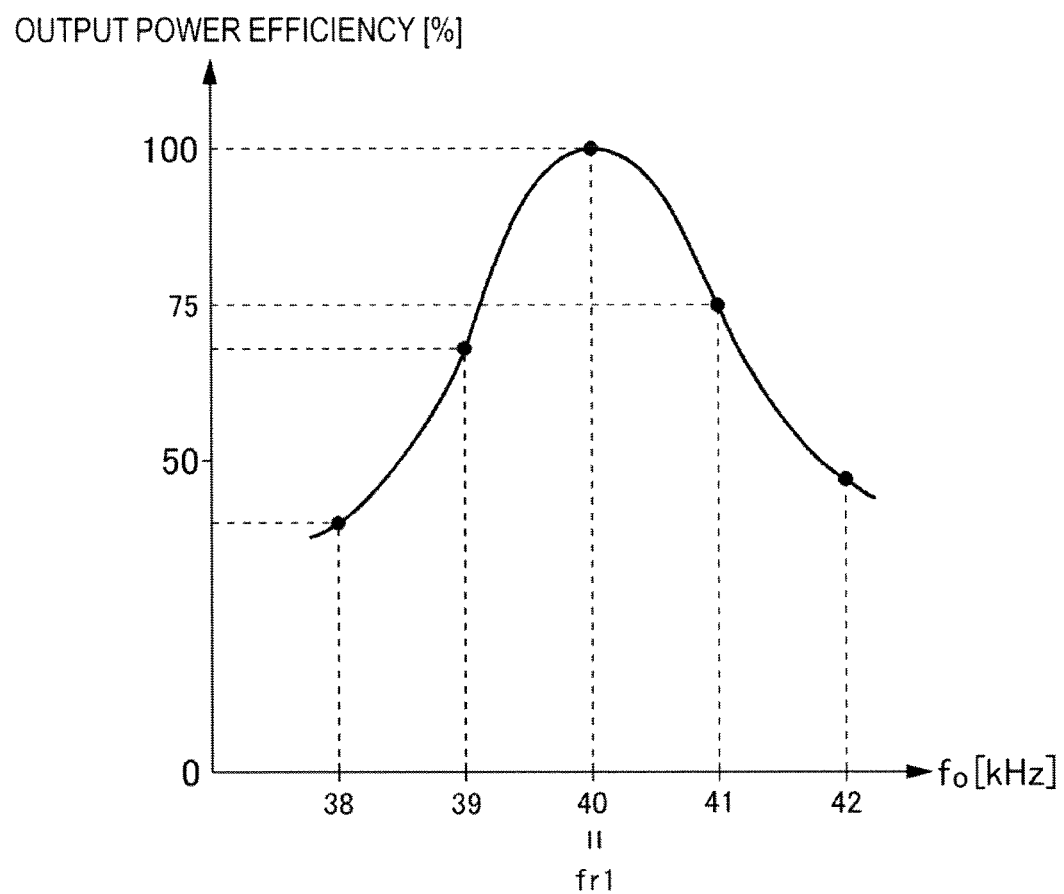
FIG. 4 is a graph illustrating a relationship between output power efficiency and drive frequency.

FIG. 4 is a graph illustrating a relationship between the output power efficiency and drive frequency fo. The output power efficiency is a ratio of power actually fed from the feeding coil L2 relative to the maximum output value. When the drive frequency fo coincides with the resonance frequency fr1, a difference between the current phase and voltage phase becomes zero and therefore the power transmission efficiency becomes maximum, with the result that output power efficiency of 100 (%) can be obtained. The output power efficiency can be measured from the magnitude of power taken from the load LD.

As can be seen from the graph of FIG. 4, when the drive frequency fo is set to 41 kHz under the condition that the resonance frequency fr1 is 40 kHz, the output power efficiency is reduced to about 75 (%). That is, the drive frequency fo and resonance frequency fr1 deviate from each other by 1 kHz, the power transmission efficiency is reduced by 25 (%).

Figure 5:
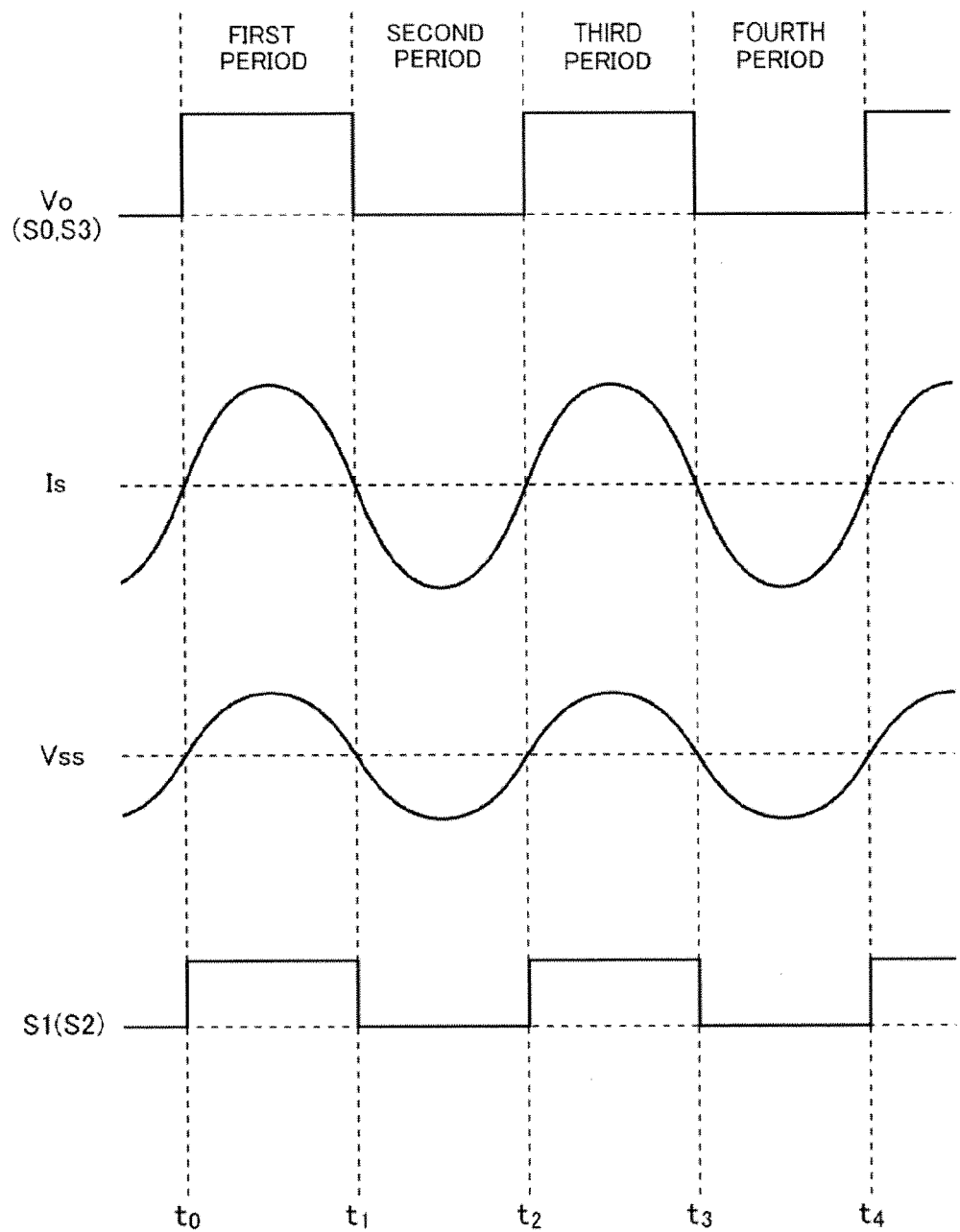
FIG. 5 is a time chart illustrating a relationship between voltage phase and current phase observed when the drive frequency and resonance frequency coincide with each other.

FIG. 5 is a time chart illustrating the voltage/current changing process observed in the case where the drive frequency fo and resonance frequency fr1 coincide with each other. Time period from time t0 to time t1 (hereinafter, referred to as "first period") is a time period during which the switching transistor Q1 is ON while the switching transistor Q2 is OFF. Time period from time t1 to time t2 (hereinafter, referred to as "second period") is a time period during which the switching transistor Q1 is OFF while the switching transistor Q2 is ON. Time period from time t2 to time t3 (hereinafter, referred to as "third period") is a time period during which the switching transistor Q1 is ON while the switching transistor Q2 is OFF. Time period from time t3 to time t4 (hereinafter, referred to as "fourth period") is a time period during which the switching transistor Q1 is OFF while the switching transistor Q2 is ON.

When the gate-source voltage VGS1 of the switching transistor Q1 exceeds a predetermined threshold Vx, the switching transistor Q1 is in a saturated state. Thus, when the switching transistor Q1 is turned ON (conductive) at time t0 which is the start timing of the first period, the source-drain current IDS1 starts flowing. In other words, the current IS starts flowing in the positive direction (the first current path). The current I2 having the same phase as that of the current IS starts flowing in the feeding coil circuit 120.

The AC voltage Vo assumes a high level at time t0, the S0 signal and S3 signal also assume a high level. Strictly speaking, the S3 signal assumes a high level slightly after the time t0; however, for simplification, it is assumed that the S3 signal assume a high level at time t0. The details of the S3 signal will be described later using FIG. 10.

The potential VSS changes in synchronization with the current I2 (current IS). The potential VSS of an analog waveform is converted into the S1 signal of a digital waveform by the comparator 142 and current phase detection circuit 144. Further, the S1 signal is shaped by the current phase detection circuit 144 and input to the phase comparison circuit 150 as the S2 signal. Strictly speaking, the S2 signal assumes a high level slightly after the time t0; however, for simplification, it is assumed that the S1 and S2 signals assume a high level at the same time.

When the switching transistor Q1 is turned OFF (non-conductive) at time t1 which is the start timing of the second period, the source-drain current IDS1 does not flow. On the other hand, the switching transistor Q2 is turned ON (conductive), the source-drain current IDS2 starts flowing. That is, the current IS starts flowing in the negative direction (the second current path).

By observing the voltage waveform of VSS, the current phase of current IS (the source-drain current IDS1 and IDS2) can be measured. In the third, fourth, and subsequent periods, the same waveforms as in the first and second periods are repeated.

The phase comparison circuit 150 compares rising edge time of the S2 signal and rising edge time of the S3 signal to calculate the phase difference td. In the case of FIG. 5, the rising edge time t0 of the S2 signal and rising edge time t0 of the S3 signal coincide with each other, so that the phase difference td=0. That is, the drive frequency fo coincides with the resonance frequency fr1. At this time, the phase comparison circuit 150 does not change the phase difference indicating voltage SC.

The conversion (shaping) of the potential VSS into digital waveform using the comparator 142, etc. makes it possible for the phase comparison circuit 150 to easily detect the phase difference td. As a matter of course, the phase comparison circuit 150 may detect the phase difference td by directly comparing the AC voltage Vo (the S0 signal) and potential VSS.

If the current I2 flowing in the feeding coil L2 is set as a measurement target as in the Patent Document 2, a new load is applied to the feeding coil L2 to change the impedance Z of the resonance circuit, resulting in degradation of the Q-value. Connecting the phase detection circuit 114 to the current path of the resonating feeding coil L2 directly is like measuring the vibration of a tuning fork while touching the tuning fork. In the wireless power transmission system 100, the current phase is measured by generating the inductive current ISS using the magnetic field generated by the feeding coil L2. The measurement load is not applied to the feeding coil circuit 120, so that it is possible to measure the current phase while suppressing the influence on the Q-value.

It is possible to use not only the feeding coil L2 but also the receiving coil L3 or loading coil L4 as the primary coil to constitute a coupling transformer so as to cause the detection coil LSS to generate the inductive current ISS. According to the experiment made by the present inventor, it has been found out that the most satisfactory operation can be obtained in the case where the detection coil LSS is set for the feeding coil circuit 120.

Figure 6:
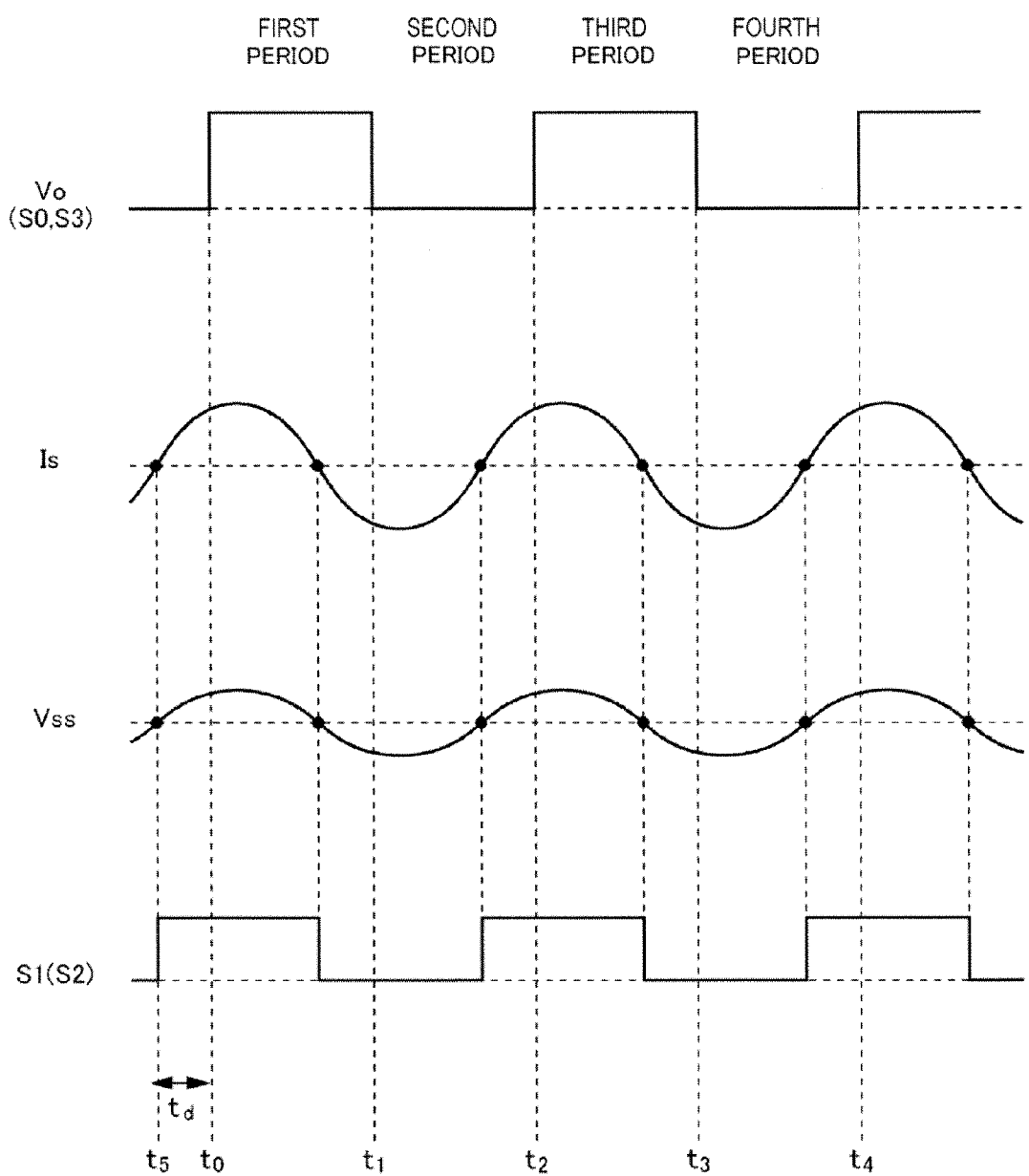
FIG. 6 is a time chart illustrating a relationship between voltage phase and current phase observed when the drive frequency is lower than the resonance frequency.

FIG. 6 is a time chart illustrating the voltage/current changing process observed in the case where the drive frequency fo is lower than the resonance frequency fr1. In the case where the drive frequency fo is lower than the resonance frequency fr1, a capacitive reactance component appears in impedance Z of the feeding coil circuit 120 (LC resonance circuit), and the current phase of the current IS advances with respect to the voltage phase. Thus, the current IS starts flowing at time t5 which is earlier than time t0. As described above, the current IS and potential VSS have the same phase, so that by comparing the voltage waveform of the potential Vo and voltage waveform of the potential VSS, the phase difference td between the current phase and voltage phase in the supply power can be detected.

As illustrated in FIG. 5, when the drive frequency fo coincides with the resonance frequency fr1, the current IS starts flowing at time t0 which is the start timing of the first period, and the potential VSS becomes higher than 0. In this case, the phase difference td is 0. When the drive frequency fo is lower than the resonance frequency fr1, the current IS starts flowing at time t5 which is earlier than time t0, and VSS becomes higher than 0, so that the phase difference td (=t0−t5) becomes more than 0. When the drive frequency fo and resonance frequency fr1 deviate from each other, the output power efficiency is degraded, and the amplitudes of the current IS and potential VSS becomes reduced as compared to those at the resonance state.

In the case where the drive frequency fo is higher than the resonance frequency fr1, an inductive reactance component appears in the impedance Z of the feeding coil circuit 120, and the current phase of the current IS delays with respect to the voltage phase. In this case, the phase difference td is less than 0.

Figure 7:
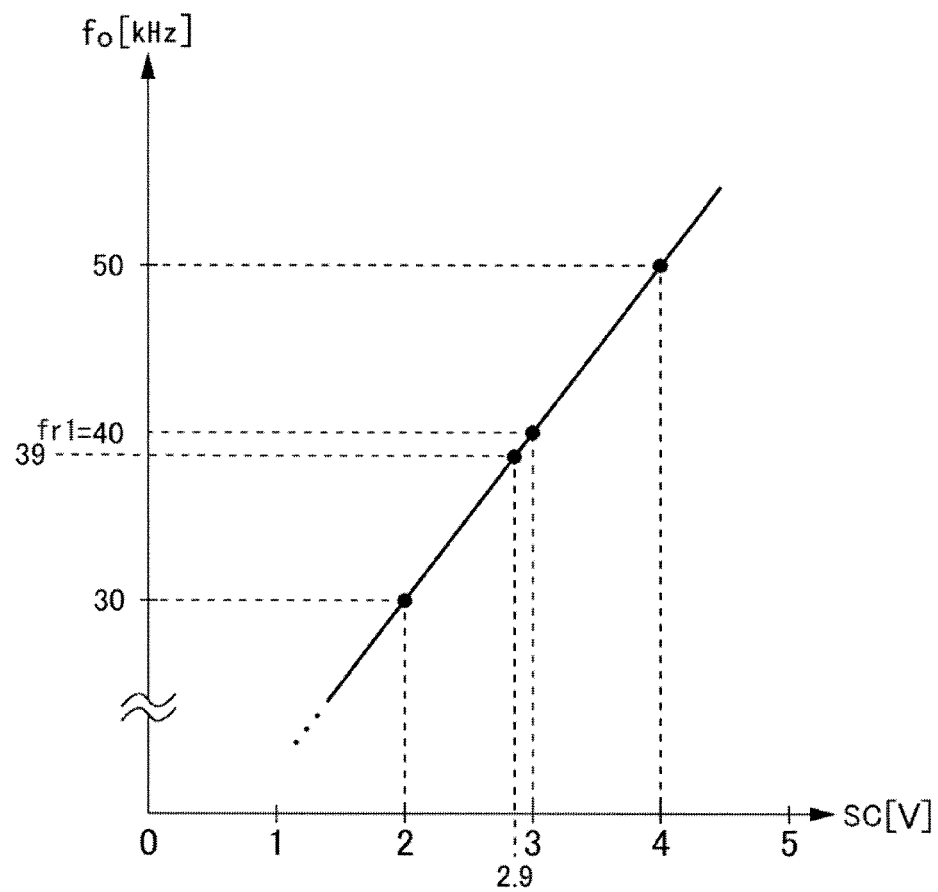
FIG. 7 is a graph illustrating a relationship between phase difference indicating voltage and drive frequency.

FIG. 7 is a graph illustrating a relationship between the phase difference indicating voltage SC and drive frequency fo. The relationship illustrated in FIG. 7 is set in the VCO 202. The magnitude of the phase difference td is proportional to the variation of the resonance frequency fr1. Thus, the phase comparison circuit 150 determines the variation of the phase difference indicating voltage SC in accordance with the phase difference td, and the VCO 202 determines the drive frequency fo in accordance with the phase difference indicating voltage SC. The settable range of the drive frequency fo is determined by the time constants of the resistors R5, R6 and capacitor C5 which are connected to the VCO 202.

The resonance frequency fr1 is 40 kHz in the initial state and, accordingly, the drive frequency fo is set to 40 kHz. The corresponding phase difference indicating voltage SC is assumed to be 3.0 (V). Assuming that the resonance frequency fr1=drive frequency fo=40 kHz as illustrated in FIG. 7, the phase difference indicating voltage SC is always 3.0 (V).

Assume that the resonance frequency fr1 is changed from 40 kHz to 39 kHz. Since the drive frequency fo (=40 kHz) is higher than the resonance frequency fr1 (=39 kHz) in this state, the phase difference td is less than 0. The phase difference td is proportional to the variation (−1 kHz) of the resonance frequency fr1. The phase comparison circuit 150 determines the variation of the phase difference indicating voltage SC based on the phase difference td. In this example, the phase comparison circuit 150 sets the variation of the phase difference indicating voltage SC to −0.1 (V) and outputs new phase difference indicating voltage SC=2.9 (V). The VCO 202 outputs the drive frequency fo=39 kHz corresponding to the phase difference indicating voltage SC=2.9 (V) according to the relationship represented by the graph of FIG. 7. With the above processing, it is possible to allow the drive frequency fo to automatically track a change of the resonance frequency fr1.

Figure 8:
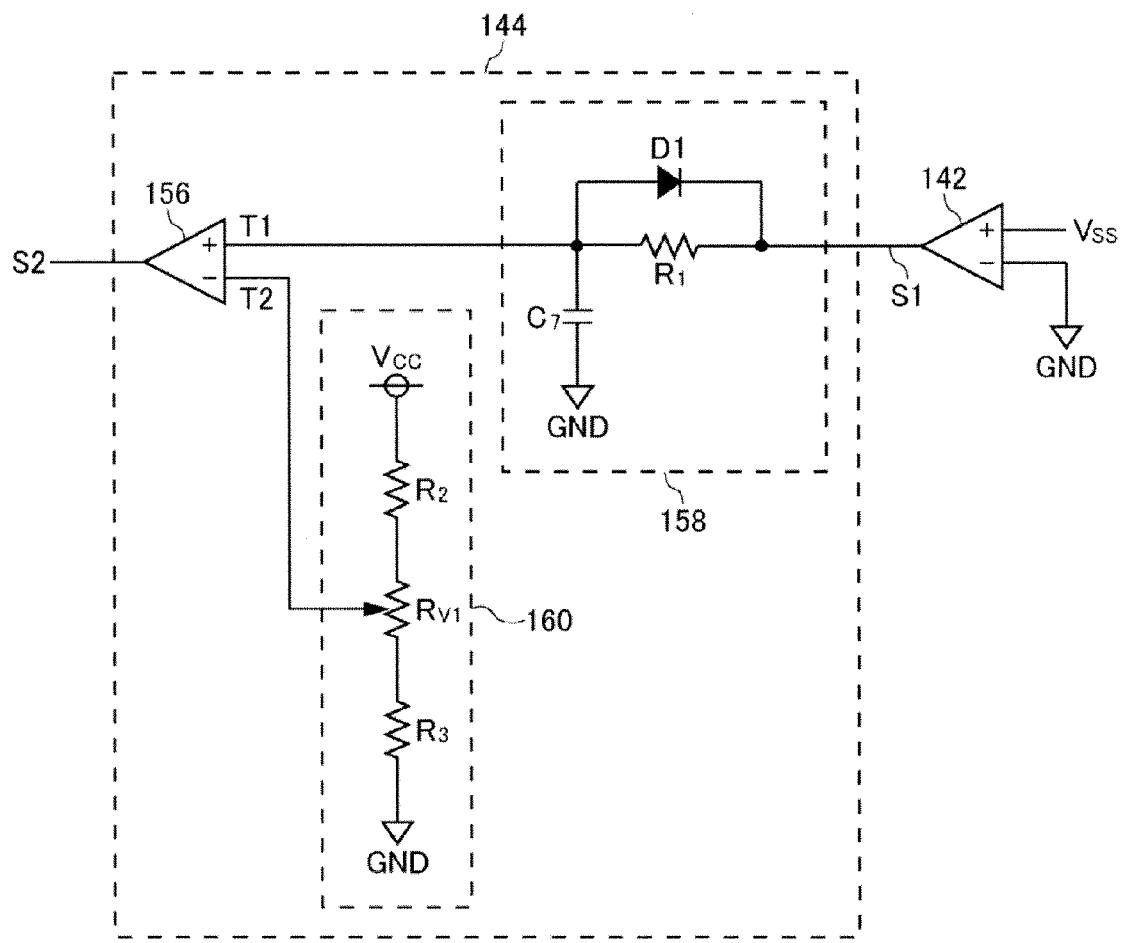
FIG. 8 is a circuit diagram of a current phase detection circuit.

FIG. 8 is a circuit diagram of the current phase detection circuit 144. The current phase detection circuit 144 includes a comparator 156, a current waveform shaping circuit 158, and a current reference adjustment circuit 160. A T1 signal (current phase signal) which is an output of the current waveform shaping circuit 158 is input to the positive terminal of the comparator 156, and a T2 signal (reference signal) which is an output of the current reference adjustment circuit 160 is input to the negative terminal of the comparator 156.

The potential VSS is shaped into the S1 signal of a digital waveform by the comparator 142 and input to the current waveform shaping circuit 158. The current waveform shaping circuit 158 shapes the S1 signal of a digital waveform (rectangular waveform) into the T1 signal of a saw-tooth waveform. In the current waveform shaping circuit 158, a resistor R1 is inserted in the path of the S1 signal, and a diode D1 is connected in parallel to the resistor R1. The transmission path of the S1 signal is grounded through a capacitor C7. In the present embodiment, the T1 signal changes in a range of 0.0 (V) to 3.0 (V).

The current reference adjustment circuit 160 is a circuit including resistors R2 and R3 and a variable resistor RV1. The power supply VCC is connected to the ground through a series resistor circuit including the resistor R2, variable resistor RV1, and resistor R3. The T2 signal is a fixed value signal representing mid-potential of the variable resistor RV1. The level of the T2 signal can be changed by adjusting the variable resistor RV1. The current reference adjustment circuit 160 generates fixed voltage as the T2 signal. In the present embodiment, the T2 signal is adjusted in a range of 0.1 (V) to 3.0 (V). A non-zero voltage value is input to the negative terminal of the comparator 156 by necessity. This is because of preventing the comparator 156 from going wrong due to simultaneous input of 0 (V) to both the positive and negative terminals of the comparator 156.

The comparator 156 outputs a high-level S2 signal when the level of the T1 signal is higher than that of the T2 signal (T1>T2) while it outputs a low level S2 signal in the rest of the time. The actual output waveform will be described in detail later using FIG. 10 and subsequent drawings.

Figure 9:
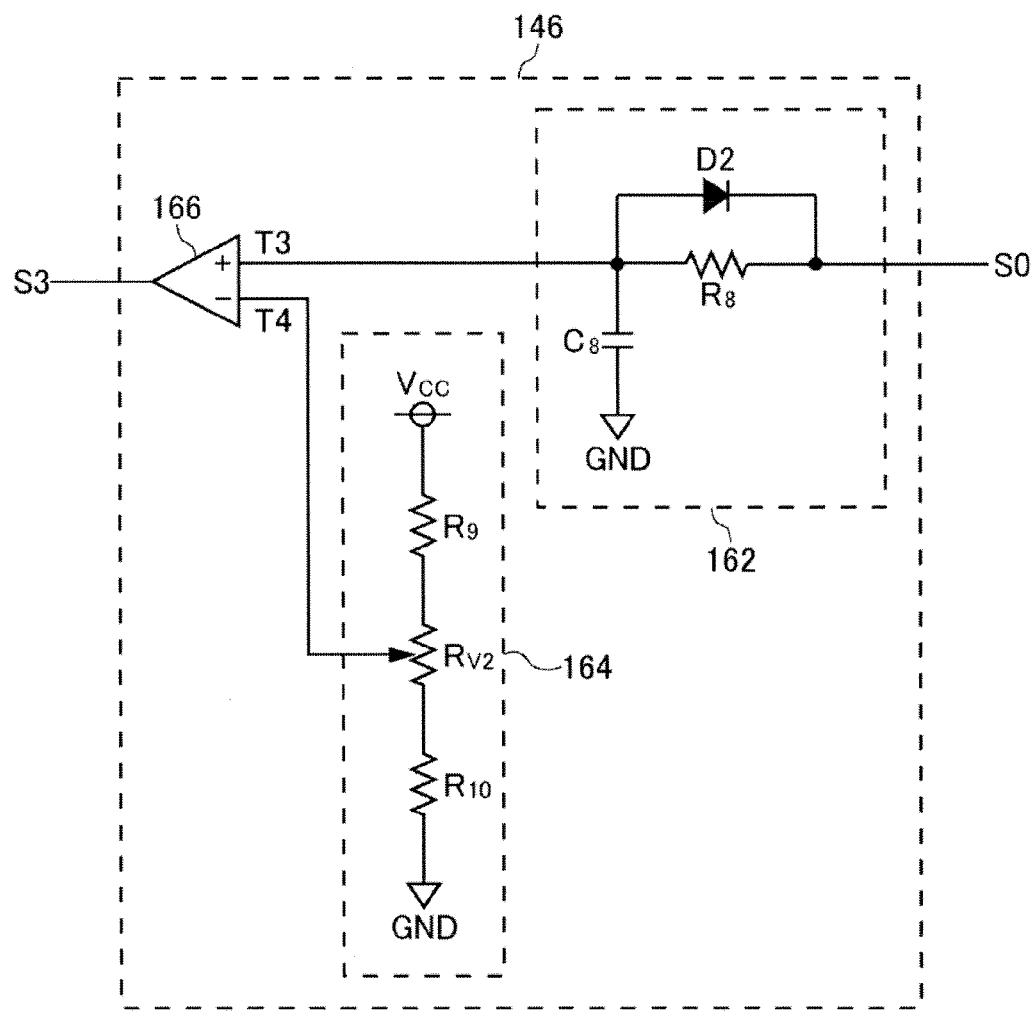
FIG. 9 is a circuit diagram of a voltage phase detection circuit.

FIG. 9 is a circuit diagram of the voltage phase detection circuit 146. The voltage phase detection circuit 146 includes a comparator 166, a voltage waveform shaping circuit 162, and a voltage reference adjustment circuit 164. A T3 signal (voltage phase signal) which is an output of the voltage waveform shaping circuit 162 is input to the positive terminal of the comparator 166, and a T4 signal (reference signal) which is an output of the voltage reference adjustment circuit 164 is input to the negative terminal of the comparator 166.

The AC voltage Vo (rectangular wave) generated by the VCO 202 is input to the voltage waveform shaping circuit 162 as the S0 signal. The voltage waveform shaping circuit 162 shapes the digital waveform of the S0 signal into the T3 signal having a saw-tooth waveform. In the voltage waveform shaping circuit 162, a resistor R8 is inserted in the path of the S0 signal, and a diode D2 is connected in parallel to the resistor R8. The transmission path of the S0 signal is grounded through a capacitor C8. In the present embodiment, the T3 signal also changes in a range of 0.0 (V) to 3.0 (V).

The voltage reference adjustment circuit 164 is a circuit including resistors R9 and R10 and a variable resistor RV2. The power supply VCC is connected to the ground through a series resistor circuit including the resistor R9, variable resistor RV2, and resistor R10. The T4 signal is a fixed value signal representing mid-potential of the variable resistor RV2. The level of the T4 signal can be changed by adjusting the variable resistor RV2. The voltage reference adjustment circuit 164 generates fixed voltage as the T4 signal. In the present embodiment, the T4 signal is adjusted in a range of 0.1 (V) to 3.0 (V). As in the case of the comparator 156, a non-zero voltage value is input to the negative terminal of the comparator 166 by necessity.

The comparator 166 outputs a high-level S3 signal when the level of the T3 signal is higher than that of the T4 signal (T3>T4), while it outputs a low-level S3 signal in the rest of time.

Figure 10:
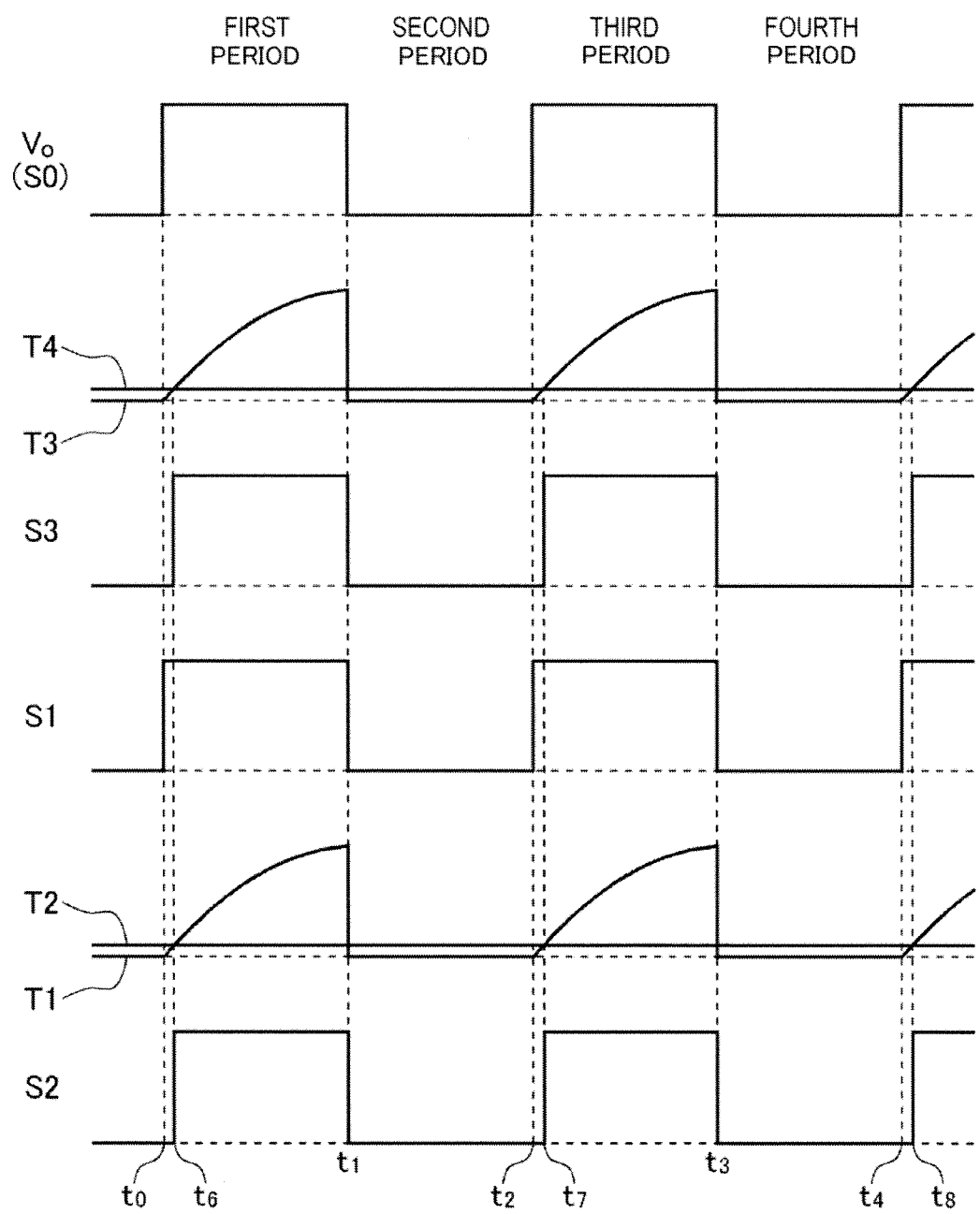
FIG. 10 is a time chart illustrating a relationship between S2 and S3 signals observed when the drive frequency and resonance frequency coincide with each other.

FIG. 10 is a time chart illustrating a relationship between the S2 and S3 signals when the drive frequency fo and resonance frequency fr1 coincide with each other. When the AC voltage Vo (S0 signal) rises at time t0, the level of the T3 signal starts increasing. When the AC voltage Vo (S0 signal) becomes zero at time t1 at which the first period is ended, the level of the T3 signal abruptly decreases from the maximum value of 3.0 (V) to 0.0 (V). When the AC voltage Vo (S0 signal) rises once again at time t2 at which the third period starts, the level of the T3 signal starts increasing once again.

On the other hand, the level of the T4 signal stays fixed as long as the variable resistor RV2 is fixed in the voltage reference adjustment circuit 164. In the example of FIG. 10, the level of the T4 signal is fixed to 0.1 (V).

The T3 and T4 signals are input to the positive and negative terminals of the comparator 166, respectively, and the S3 signal is output from the comparator 166. During the period during which the level of the T4 signal is higher than that of T3 signal (T4>T3), the level of the S3 signal is higher than 0 (S3>0), while in the rest of time, the level of the S3 signal is 0 (S3=0). In FIG. 10, at time t6 slightly after time t0, the level of T4 signal becomes higher than that of the T3 signal (hereinafter, such a timing is referred to also as "voltage phase value"). As a result, the S3 signal rises slightly later than the S0 signal; however, the signal waveform itself of the S3 signal is the same as that of the S0 signal.

As described using FIG. 5, if the drive frequency fo and resonance frequency fr1 coincide with each other, the S1 signal also rises at time t0. At this time, the level of the T1 signal also starts increasing. When the S1 signal becomes zero at time t1 at which the first period is ended, the level of the T1 signal abruptly decreases from the maximum value of 3.0 (V) to 0.0 (V). When the S1 signal rises once again at time t2 at which the third period starts, the level of the T1 signal starts increasing once again.

The level of the T2 signal stays fixed as long as the variable resistor RV1 is fixed in the comparator 166. In the example of FIG. 10, the level of the T2 signal is fixed to 0.1 (V).

The T1 and T2 signals are input to the positive and negative terminals of the comparator 156, respectively, and the S2 signal is output from the comparator 156. During the period during which the level of the T2 signal is higher than that of T1 signal (T2>T1), the level of the S2 signal is higher than 0 (S2>0), while in the rest of time, the level of the S2 signal is 0 (S2=0). As in the case of the S3 signal, the S2 signal rises at time t6 (hereinafter, such a timing is referred to also as "current phase value"). This is because the levels of the T4 signal and T2 signal are the same.

When the drive frequency fo and resonance frequency fr1 coincide with each other, the S1 signal also rises at time t0 at which the S0 signal rises. Further, if the levels of the T4 signal and T2 signal are the same, the S2 signal also rises at time t6 at which the S3 signal rises. The phase comparison circuit 150 detects a deviation between the rise times of the S2 signal and S3 signal as the phase difference to thereby detect the deviation between the drive frequency fo and resonance frequency fr1, in other words, deviation between the current phase value and voltage phase value.

When the level of the T4 signal is made to be zero, the levels of both the T3 signal and T4 signal become zero (T3=T4=0) during the second period and fourth period, with the result that the comparator 166 goes wrong. The same can be said for the T2 signal. Thus, the lowest levels of the T2 and T4 signals are set to a value higher than 0.

Figure 11:
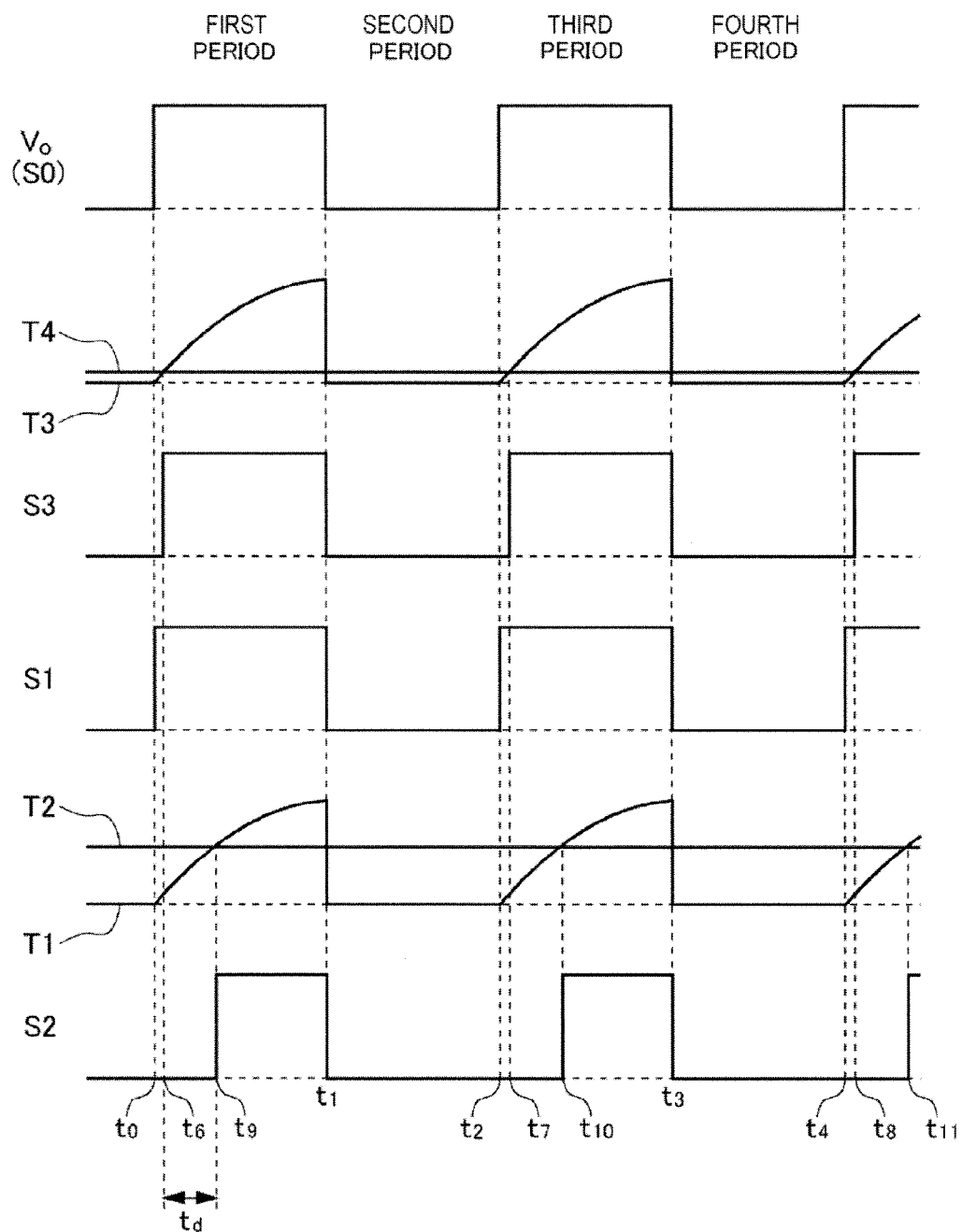
FIG. 11 is a time chart observed when the level of a T2 signal is made to rise in a state of FIG. 10.

FIG. 11 is a time chart observed when the level of the T2 signal is made to rise in a state of FIG. 10. By adjusting the variable resistor RV1 of the current phase detection circuit 144, the level of the T2 signal can be made to rise. In this case, the time at which the level of the T2 signal is higher than that of the T1 signal (T2>T1) is time t9 which is later than time t6. As a result, the rise time (time t9: current phase value) of the S2 signal and rise time (time t6: voltage phase value) of the S3 signal do not coincide with each other, so that the phase comparison circuit 150 detects the phase difference td. Since the levels of the T4 signal and T2 signal becomes non-coincident with each other even though the drive frequency fo and resonance frequency fr1 actually coincide with each other, the phase comparison circuit 150 detects the phase difference td.

For example, it is assumed that drive frequency fo=resonance frequency fr1=40 kHz be established. When the level of the T2 signal is increased, the phase comparison circuit 150 detects the phase difference td and changes the phase difference indicating voltage SC. The VCO 202 determines that the current phase is delayed from the voltage phase and reduces the drive frequency fo so as to make the drive frequency fo and resonance frequency fr1 coincide with each other.

Figure 12:
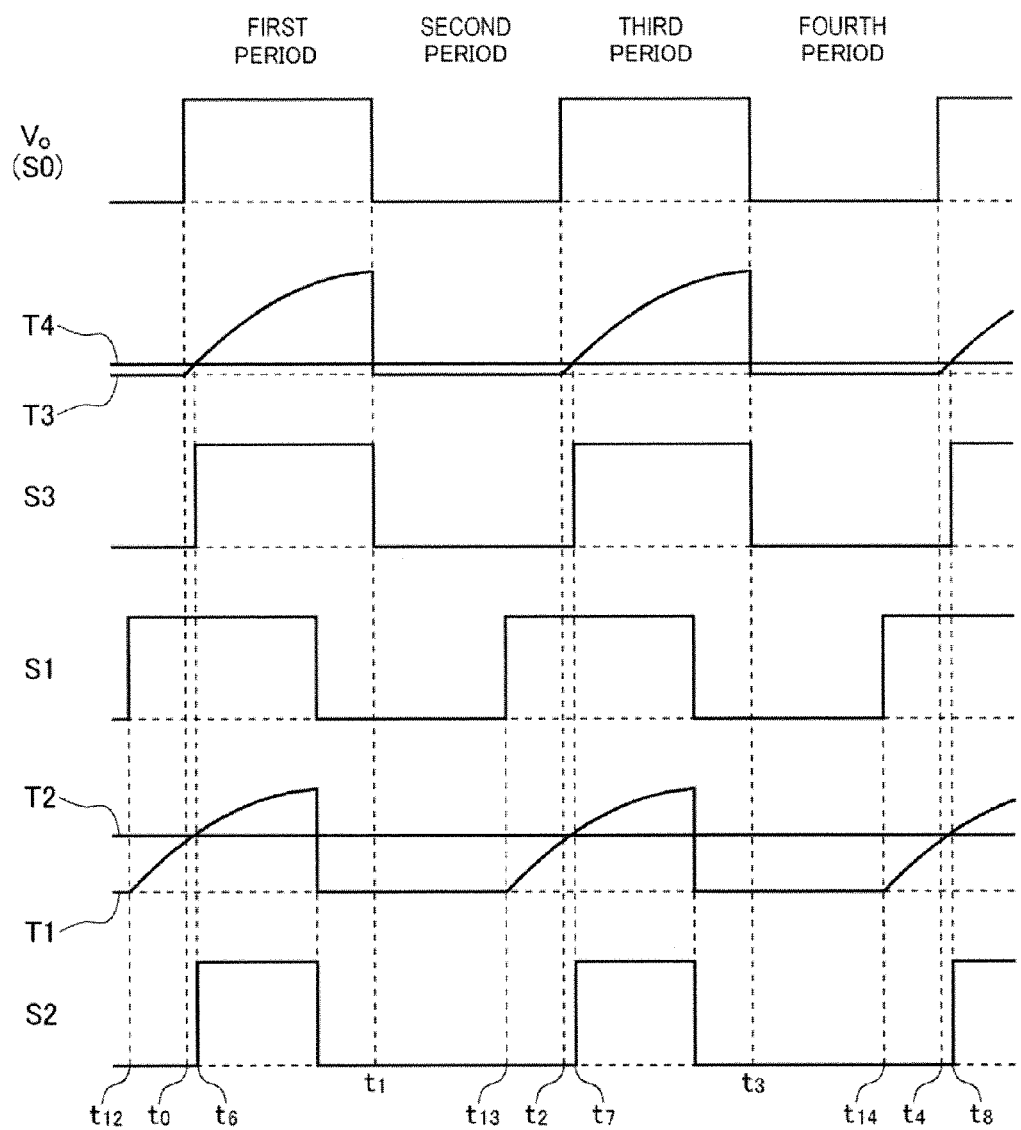
FIG. 12 is a time chart observed when a predetermined time period has elapsed from a state illustrated in FIG. 11.

FIG. 12 is a time chart observed when a predetermined time period has elapsed from the state illustrated in FIG. 11. The VCO 202 reduces the drive frequency fo so as to return the phase difference td to zero. Here, it is assumed that the VCO 202 reduce the drive frequency fo from 40 kHz to 39 kHz. Since the resonance frequency fr1 is 40 kHz, the current phase advances with respect to the voltage phase. As a result, the S1 signal rises at time t12 earlier than time t0. As a result of the advancement of the phase of the S1 signal, the rise time of the S2 signal advances to time t6 at which the S3 signal rises. Since the phase difference td is thus eliminated, the drive frequency fo becomes stable at 39 kHz. However, the actual resonance frequency fr1 stays at 40 kHz, so that the feeding coil circuit 120 and receiving coil circuit 130 are not in the maximum resonance state. So to speak, adjusting the T2 signal (reference signal) intentionally changes the rise time (current phase value) of the S2 signal to mislead the phase comparison circuit 150 and VCO 202. As described using FIG. 4, when the drive frequency fo and resonance frequency fr1 becomes non-coincident with each other, the output voltage efficiency is degraded. By adjusting the variable resistor RV1, transmission power can be controlled.

Figure 13:
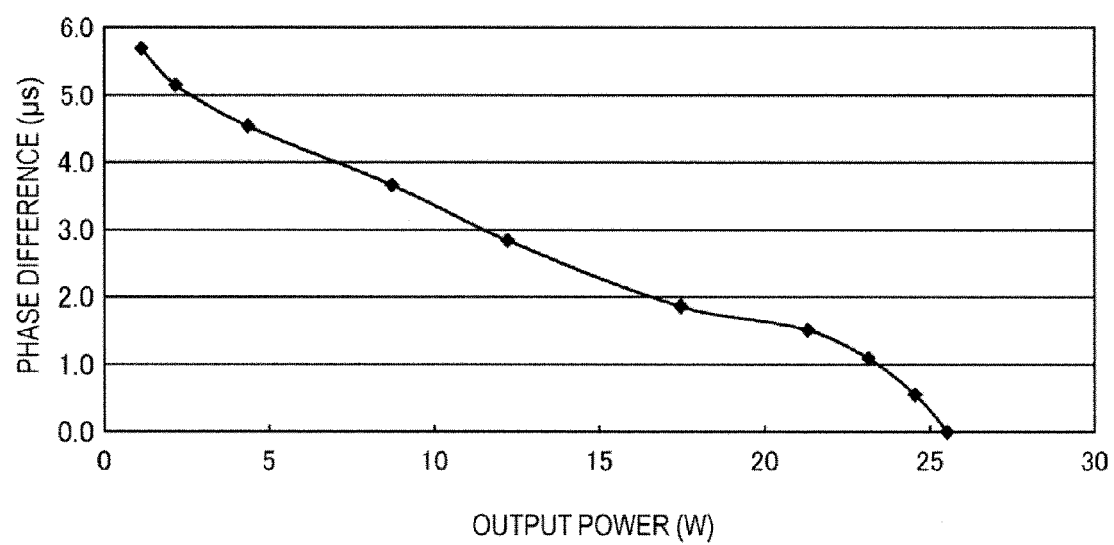
FIG. 13 is a graph illustrating a relationship between output power and phase difference.

FIG. 13 is a graph illustrating a relationship between output power and phase difference. The horizontal axis represents output power (W) taken from the load LD, and vertical axis represents phase difference td (μsec). It is assumed here that the levels of the T2 and T4 signals be the same. As is clear from FIG. 13, when the phase difference td is 0, the maximum output power can be obtained. This graph illustrates that the maximum output power efficiency can be obtained when the feeding coil circuit 120 is in a resonance state.

Figure 14:
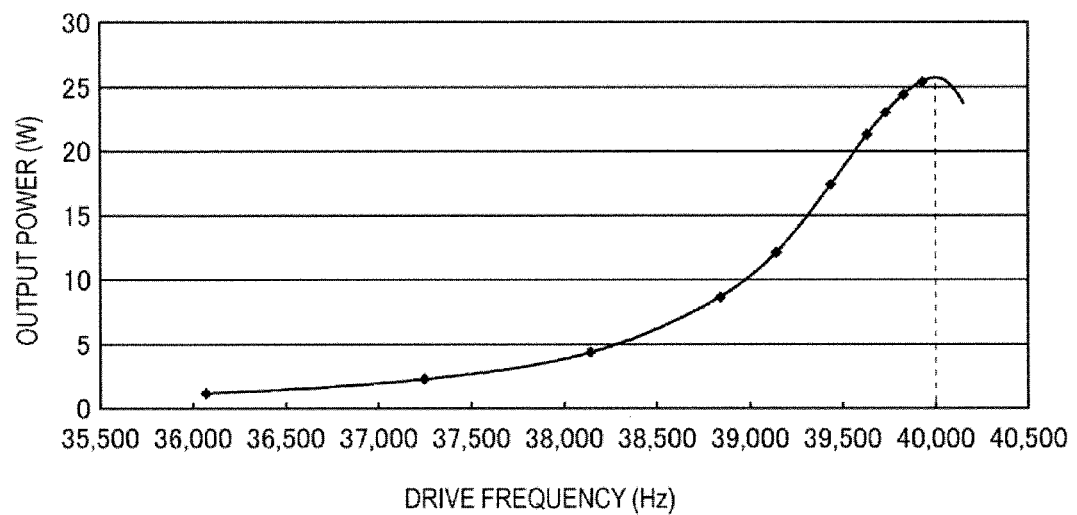
FIG. 14 is a graph illustrating a relationship between drive frequency and output power.

FIG. 14 is a graph illustrating a relationship between drive frequency fo and output power. The horizontal axis represents drive frequency fo (Hz), and vertical axis represents output power (W). It is assumed here that the levels of the T2 and T4 signals be the same. As is clear from FIG. 14, when the drive frequency fo is 40 kHz, the maximum output power can be obtained. This graph also illustrates that the maximum output power efficiency can be obtained when the resonance frequency fr and drive frequency fo coincide with each other.

This reveals that by intentionally generating the phase difference and intentionally deviating the drive frequency fo from the resonance frequency fr, the output power can be reduced.

Figure 15:
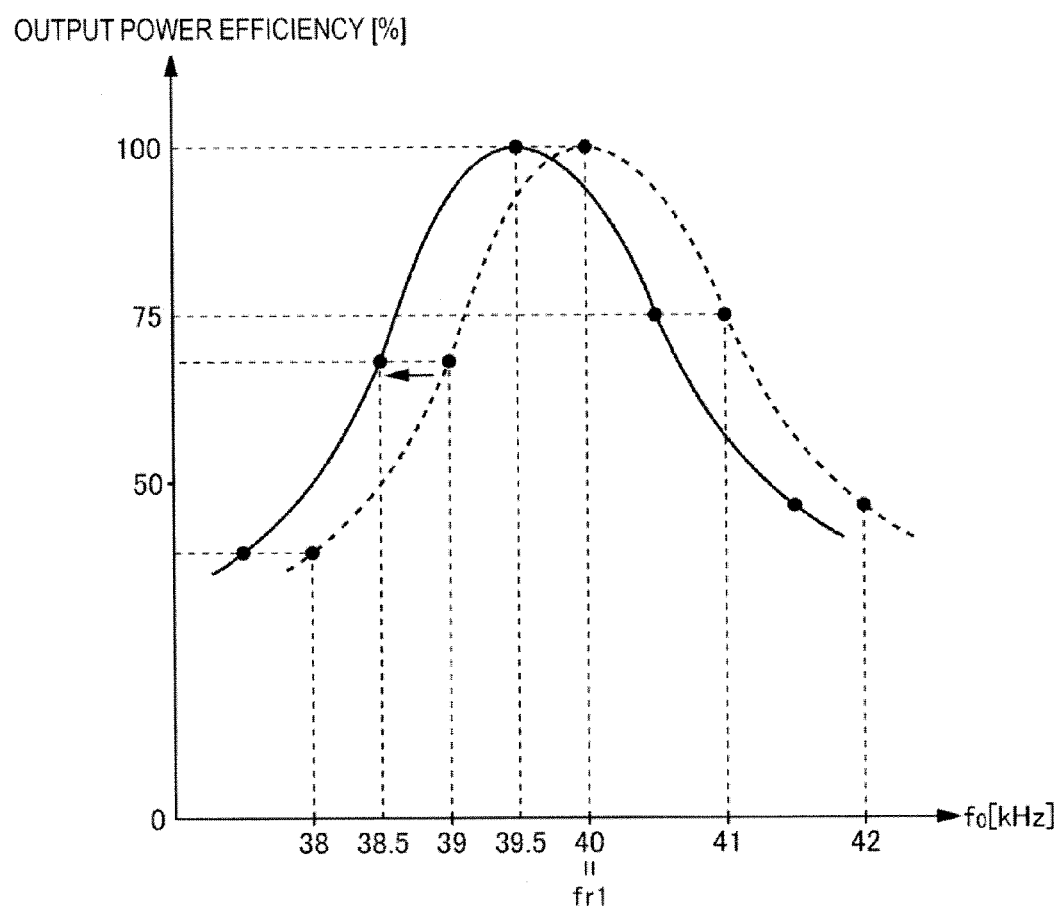
FIG. 15 is a graph illustrating a relationship between output power efficiency and drive frequency in a state where the resonance frequency is changed.

FIG. 15 is a graph illustrating a relationship between output power efficiency and drive frequency fo in a state where the resonance frequency fr1 is changed. It is assumed here that the level of the T2 signal be adjusted so as to make the phase difference td becomes 0 under the condition that the resonance frequency fr1 is 40 kHz and the drive frequency fo is 39 kHz. In other words, when fr1=fo+1.0 is established, the phase difference td becomes 0.

In this state, it is assumed that the resonance frequency fr1 is changed from 40 kHz to 39.5 kHz for some reason. The resonance characteristic curve is translated to the left by 0.5 kHz (=40−39.5). Then, 39.5<39+1.0, i.e., fr1<fo+1.0 is established, so that the phase difference td is detected. The VCO 202 reduces the drive frequency by 0.5 kHz to 38.5 kHz. Then, fr1=fo+1.0 is established once again, so that phase difference becomes 0. As a result, the drive frequency fo is stable at 38.5 kHz.

That is, when the resonance frequency fr1 is reduced by 0.5 kHz, the drive frequency fo is automatically reduced by 0.5 kHz. As described above, even when the resonance frequency fr1 is changed by an external factor, it is possible to keep the output power efficiency at a fixed level.

Figure 16:
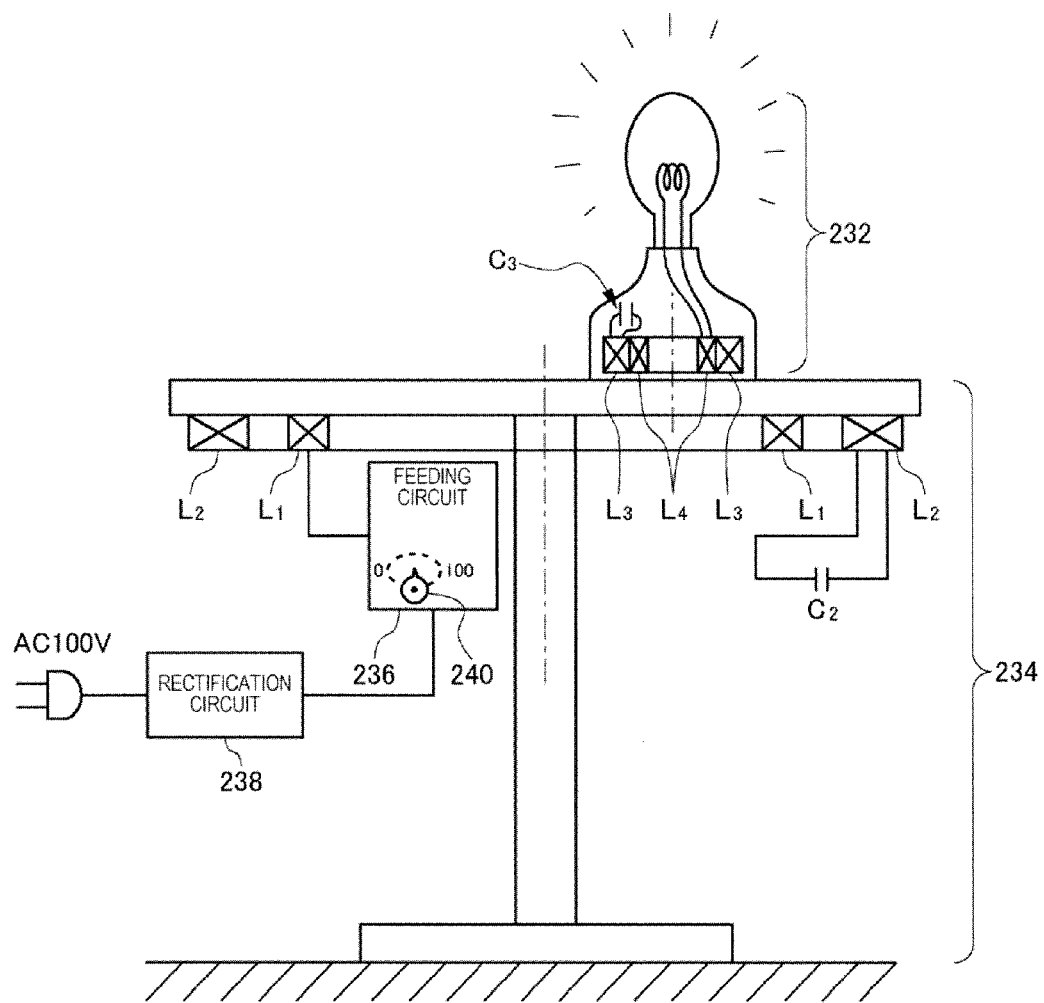
FIG. 16 is a side view of a table and a table lamp realized by using the wireless power transmission system.

FIG. 16 is a side view of a table 234 and a table lamp 232 realized by using the wireless power feeding system 100. The table 234 functions as the abovementioned wireless power feeder 116. A feeding coil L2 is wound on the rear side of the table 234, and an exciting coil L1 is wound inside the feeding coil L2 concentrically with the feeding coil L2. The feeding coil L2 is connected to a capacitor C2 to constitute a feeding coil circuit 120. The feeding coil circuit 120 may be installed on the rear side of the table plate as a whole or housed inside the table plate.

The exciting coil L1 is connected to a feeding circuit 236. The feeding circuit 236 is a circuit including a power transmission control circuit 200 and a phase detection circuit 114 and can change the level of an T2 signal by means of an adjustment dial 240. In other words, power control can be achieved by means of the adjustment dial 240. The feeding circuit 236 is connected a commercial AC power supply through the rectification circuit 238. AC voltage of the commercial AC power supply is converted into DC voltage by the rectification circuit 238 and is supplied as a power supply Vdd for the feeding circuit 236.

The table lamp 232 has inside thereof a wireless power receiver 118. A receiving coil L3 is wound in the lower portion of the table lamp 232, and a loading coil L4 is wound inside the receiving coil L3 concentrically with the receiving coil L3. A capacitor C3 is connected to the receiving coil L3 to constitute a receiving coil circuit 130. The lamp is connected to the loading coil L4 as a load LD. This lamp may turn on by receiving AC current. Further, AC current 14 flowing in the loading coil L4 may be converted into DC current by a not illustrated rectification circuit for supply to the lamp.

The table 234 feeds power to the table lamp 232 by wireless. Thus, a power cord is not required for the table lamp 232. The brightness of the table lamp 232 is adjusted by the table 234 side using the adjustment dial 240.

Figure 17:
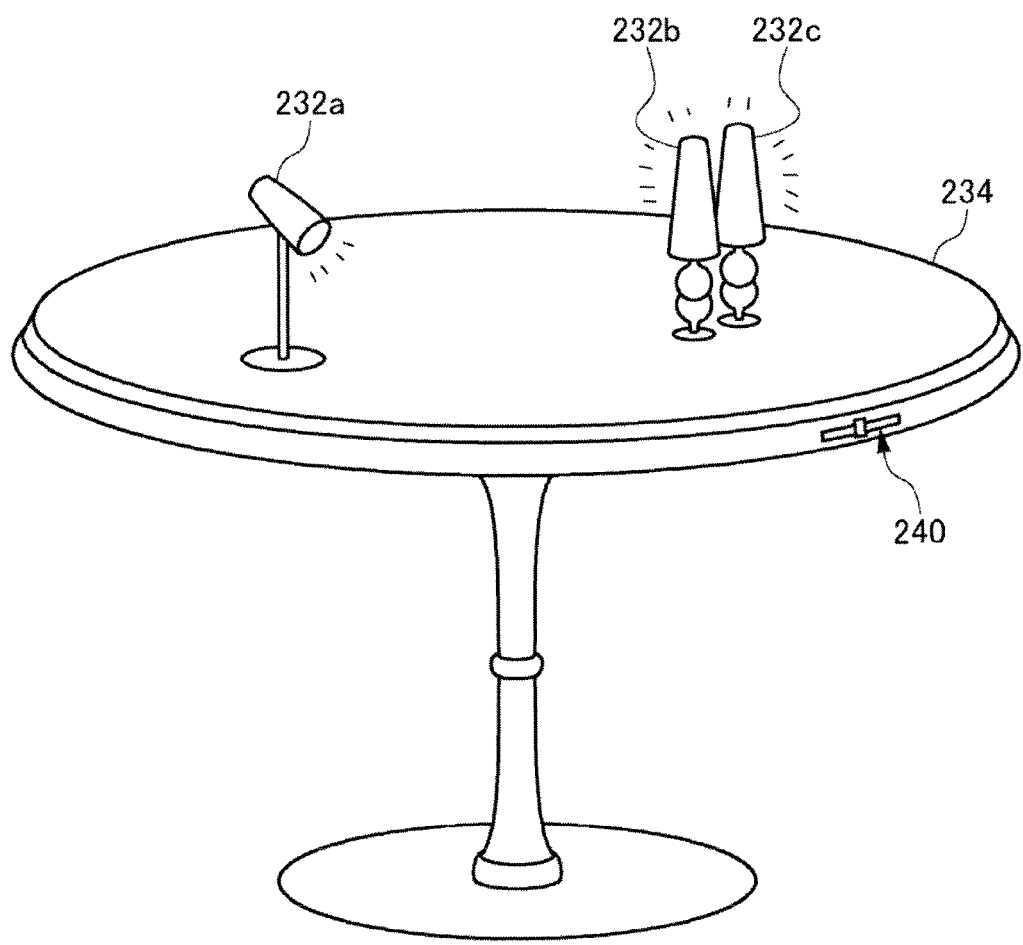
FIG. 17 is a view illustrating the outer appearances of the table and table lamp.

FIG. 17 is a view illustrating the outer appearances of the table 234 and table lamp 232. As illustrated in FIG. 17, the table 234 may incorporate the coils, feeding circuit 236, and the like. Further, the adjustment dial 240 may be provided on the side surface or top of the table 234. In the example of FIG. 17, three table lamps 232a, 232b, and 232c are placed on the top of the table 234. Since power cords are not required, it is possible to keep the top of the table 234 neat and tidy even in the case where a plurality of table lamps 232 are placed on the table 234. Further, the plurality of table lamps 232 can freely be laid out. Further, this configuration is excellent not only in terms of aesthetic purpose but in terms of safety. For example, there is no risk of stumbling over the power cord. Furthermore, the plurality of table lamps 232 can collectively be controlled by means of the adjustment dial 240, improving convenience.

Figure 18:
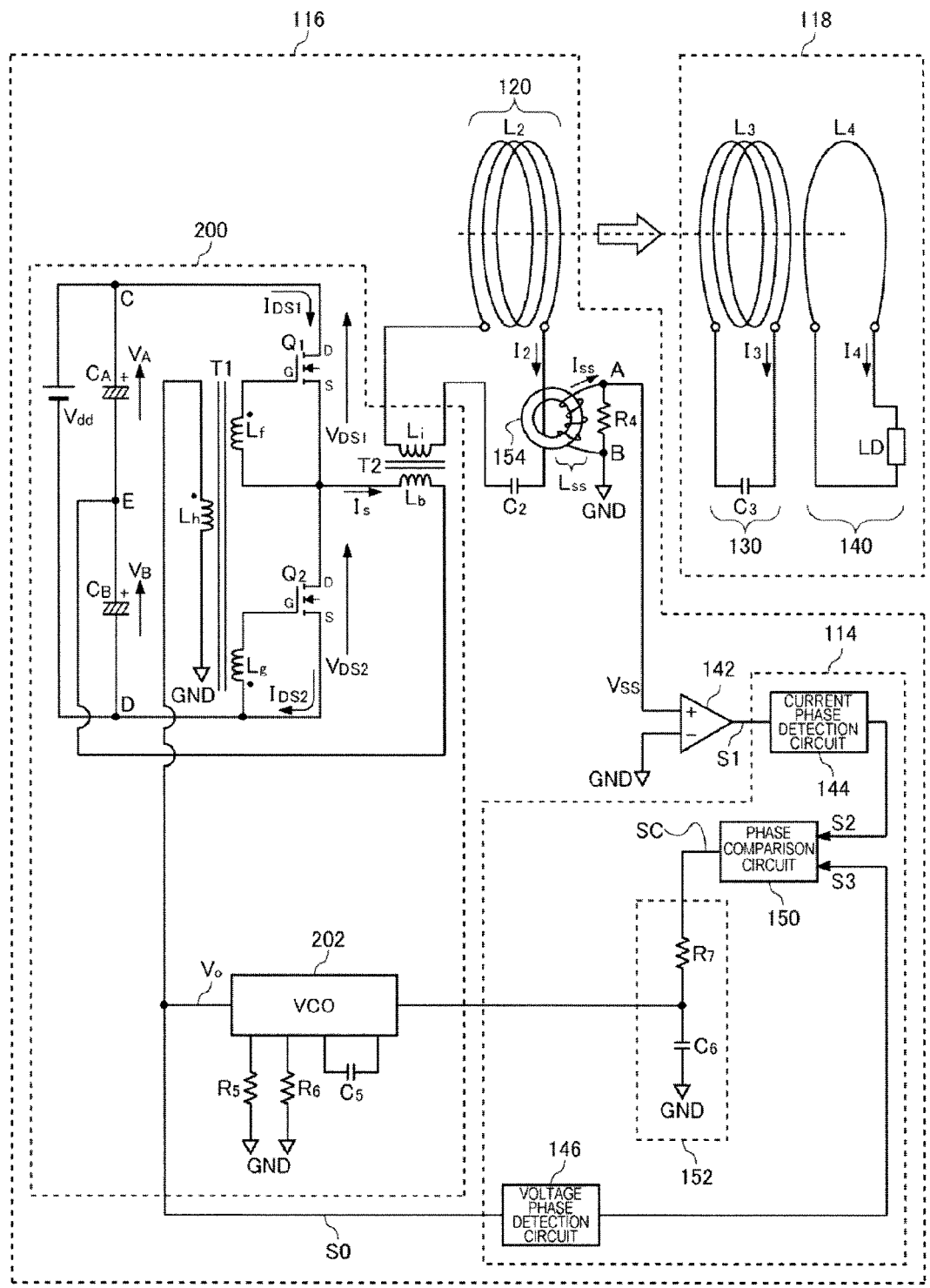
FIG. 18 is a system configuration view of a modification of the wireless power transmission system.

FIG. 18 is a system configuration view of a wireless power transmission system 100 which is a modification of the present embodiment. In the wireless power transmission system 100 of the modification, the power transmission control circuit 200 directly drives the feeding coil circuit 120 without intervention of the exciting circuit 110. Components designated by the same reference numerals as those of FIG. 2 have the same or corresponding functions as those in FIG. 2.

The feeding coil circuit 120 in the modification is a circuit in which the transformer T2 secondary coil Li is connected in series to the feeding coil L2 and capacitor C2. The transformer T2 secondary coil Li constitutes a coupling transformer T2 together with the transformer T2 primary coil Lb and receives AC power from the power transmission control circuit 200 by electromagnetic induction. Thus, the AC power may be directly fed from the power transmission control circuit 200 to the feeding coil circuit 120 without intervention of the exciting circuit 110.

[Second Embodiment]

Figure 19:
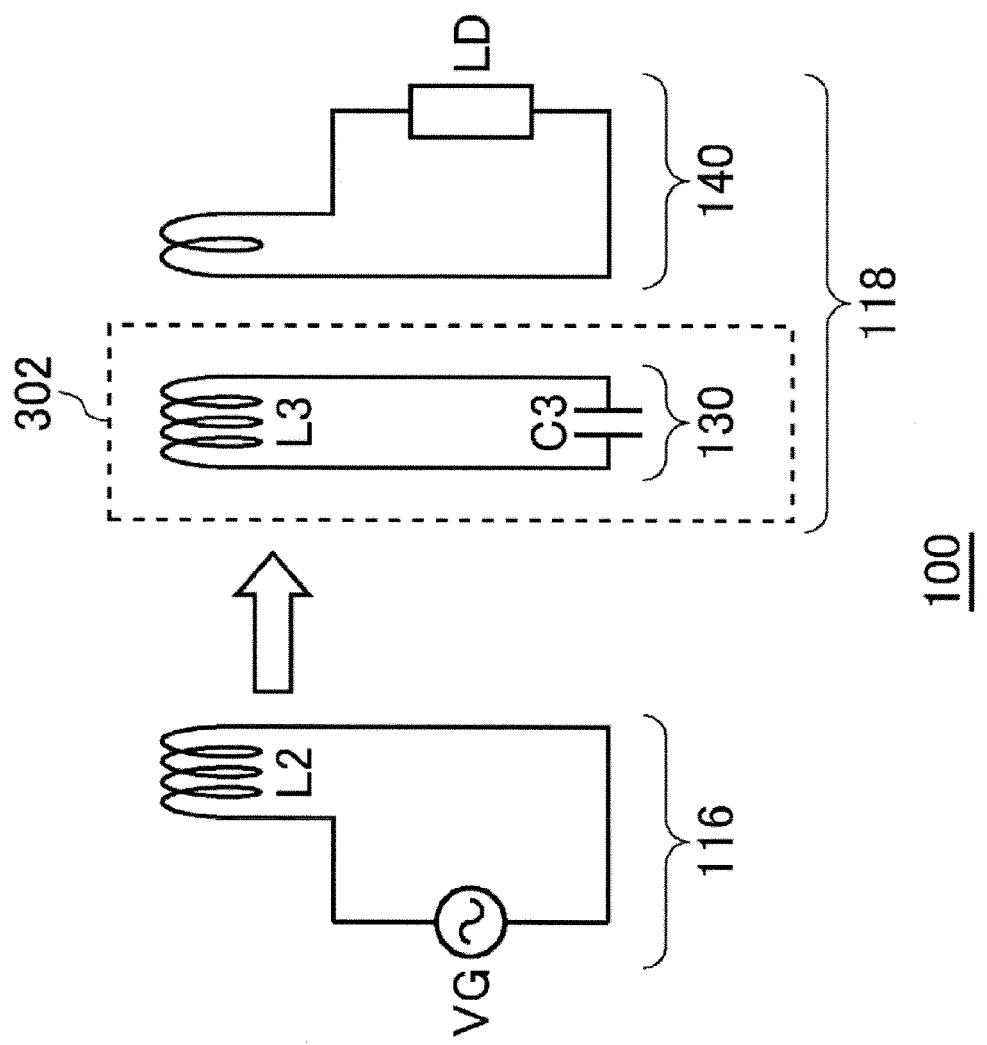
FIG. 19 is a principle view of a wireless power transmission system according to a second embodiment of the present invention.

FIG. 19 is a view illustrating operation principle of the wireless power transmission system 100 according to a second embodiment. As in the case of the first embodiment, the wireless power transmission system 100 according to the second embodiment includes the wireless power feeder 116 and wireless power receiver 118. However, although the wireless power receiver 118 includes the power receiving LC resonance circuit 302, the wireless power feeder 116 does not include the power feeding LC resonance circuit 300. That is, the power feeding coil L2 does not constitute a part of the LC resonance circuit. More specifically, the power feeding coil L2 does not form any resonance circuit with other circuit elements included in the wireless power feeder 116. No capacitor is connected in series or in parallel to the power feeding coil L2. Thus, the power feeding coil L2 does not resonate in a frequency at which power transmission is performed.

The power feeding source VG supplies AC current of the resonance frequency fr1 to the power feeding coil L2. The power feeding coil L2 does not resonate but generates an AC magnetic field of the resonance frequency fr1. The power receiving LC resonance circuit 302 resonates by receiving the AC magnetic field. As a result, large AC current flows in the power receiving LC resonance circuit 302. Studies conducted by the present inventor have revealed that formation of the LC resonance circuit is not essential in the wireless power feeder 116. The power feeding coil L2 does not constitute a part of the power feeding LC resonance circuit, so that the wireless power feeder 116 does not resonate at the resonance frequency fr1. It has been generally believed that, in the wireless power feeding of a magnetic field resonance type, making resonance circuits which are formed on both the power feeding side and power receiving side resonate at the same resonance frequency fr1 (=fr0) allows power feeding of large power. However, it is found that even in the case where the wireless power feeder 116 does not contain the power feeding LC resonance circuit 300, if the wireless power receiver 118 includes the power receiving LC resonance circuit 302, the wireless power feeding of a magnetic field resonance type can be achieved.

Even when the power feeding coil L2 and power receiving coil L3 are magnetic-field-coupled to each other, a new resonance circuit (new resonance circuit formed by coupling of resonance circuits) is not formed due to absence of the capacitor C2. In this case, the stronger the magnetic field coupling between the power feeding coil L2 and power receiving coil L3, the greater the influence exerted on the resonance frequency of the power receiving LC resonance circuit 302. By supplying AC current of this resonance frequency, that is, a frequency near the resonance frequency fr1 to the power feeding coil L2, the wireless power feeding of a magnetic field resonance type can be achieved. In this configuration, the capacitor C2 need not be provided, which is advantageous in terms of size and cost.

Figure 20:
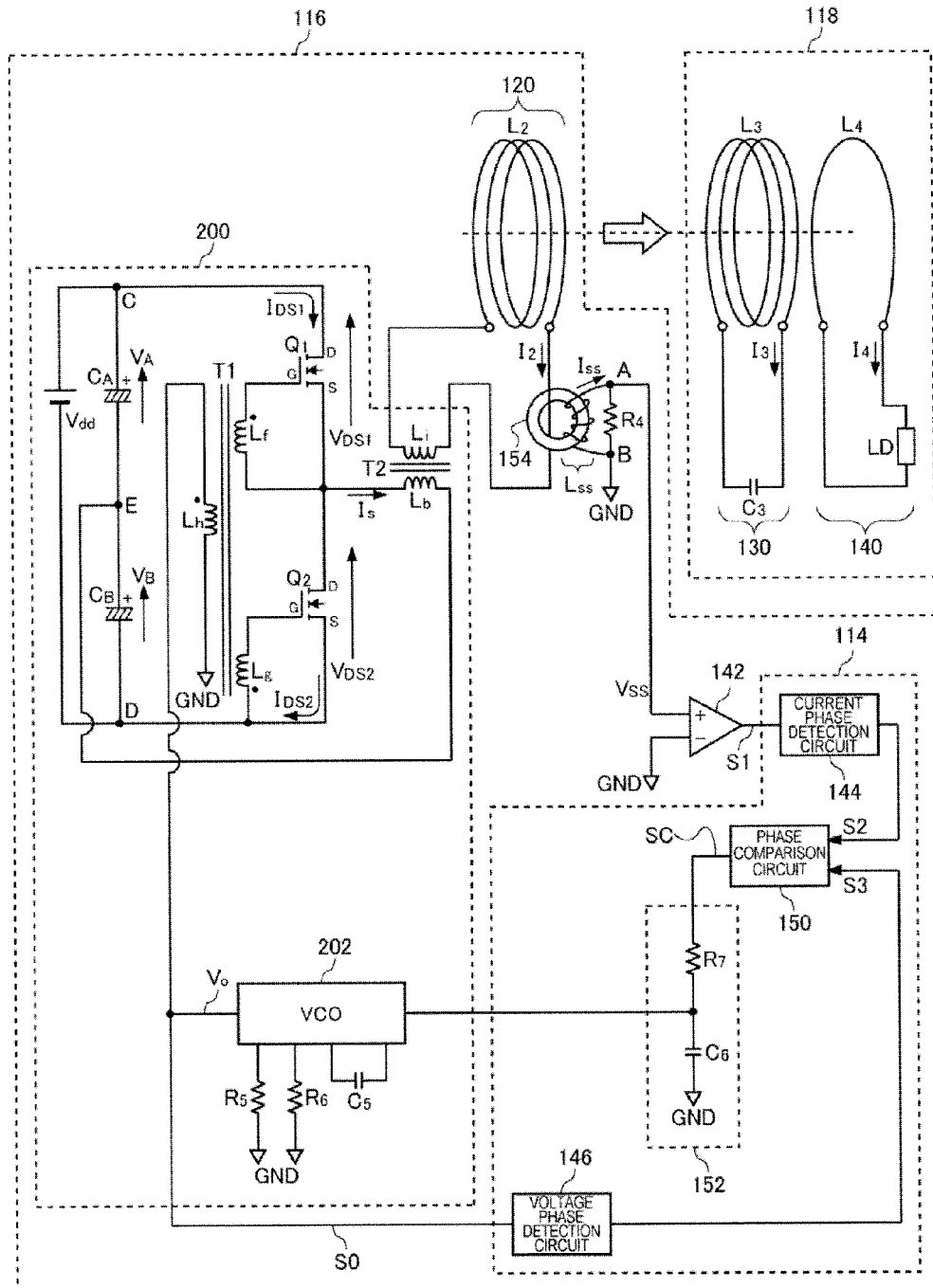
FIG. 20 is a system configuration view of a wireless power transmission system according to a second embodiment.

FIG. 20 is a system configuration view of the wireless power transmission system 100 according to the second embodiment. In the wireless power transmission system 100 of the second embodiment, the capacitor C2 is omitted. Other points are the same as the first embodiment.

The wireless power transmission system 100 has been described above based on the preferred embodiment. As described using FIGS. 2 and 3, in the wireless power feeding of a magnetic field resonance type, the coincidence degree between the resonance frequency fr1 and drive frequency fo greatly influences on the power transmission efficiency. The use of the phase detection circuit 114 allows the drive frequency fo to automatically track a change of the resonance frequency fr1, making it easy to maintain the power transmission efficiency at its maximum value even if use conditions are changed. Further, by adjusting the level of the T2 signal, it is possible to intentionally reduce the power transmission efficiency. That is, intentional creation of a resonance or non-resonance state makes it easy to control the transmission power of the wireless feeder 116. According to the experiment made by the present inventor, significant power loss was not found to occur in association with the level adjustment of the T2 signal.

In the case of a conventional table lamp, a power cord gets in the way, so that a pendant lamp is often used for a dining table. According to the table 234 of the present invention, it is possible to eliminate the need of providing a power cord of the table lamp, thereby increasing availability of the table lamp 232. For example, there may be a case where food looks more attractive under illumination of the table lamp. Further, the illumination location is fixed in the case of the pendant lamp, while the table lamp 232 can freely be laid out, enabling various forms of illumination. In addition, a plurality of table lamps 232 can collectively be controlled by the table 234 side.

The above embodiments are merely illustrative of the present invention and it will be appreciated by those skilled in the art that various modifications may be made to the components of the present invention and a combination of processing processes and that the modifications are included in the present invention.

Although the power transmission control circuit 200 is formed as a half-bridge type circuit in the above embodiment, the power transmission control circuit 200 may be formed as a push-pull type circuit. The T1 signal generated by the current waveform shaping circuit 158 or T3 signal generated by the voltage waveform shaping circuit 162 may be an AC signal having not only a saw-tooth waveform but also a triangle wave or a sine wave in which a voltage value is gradually increased or decreased within a predetermined time period. Although the variable resistor RV1 of the current phase detection circuit 144 is set as an adjustment target in the above embodiment, the variable resistor RV2 of the voltage phase detection circuit 146 or both the variable resistors RV1 and RV2 may be set as adjustment targets. Further, only the current phase detection circuit 144 may be provided. In this case, it is necessary to perform setting such that the S0 signal does not become zero.

The "AC power" used in the wireless power transmission system 100 may be transmitted not only as an energy but also as a signal. Even in the case where an analog signal or digital signal is fed by wireless, the wireless power transmission method of the present invention may be applied.

What is claimed is:

1. A wireless power feeder for wirelessly feeding power from a feeding coil to a receiving coil using a magnetic field resonance phenomenon between the feeding coil and the receiving coil, the wireless power feeder comprising:
    the feeding coil;
    a power transmission control circuit that feeds AC power to the feeding coil;
    a phase detection circuit that detects a phase difference between a voltage phase and a current phase of the AC power, wherein
    the power transmission control circuit adjusts a drive frequency of the AC power such that the phase difference is reduced, and
    in the phase detection circuit, a detected phase value of one or both of the voltage and current phases is changed intentionally.

2. The wireless power feeder according to claim 1, wherein the phase detection circuit compares a first phase value indicating a timing at which a voltage level of the AC power becomes a first reference value and a second phase value indicating a timing at which a current level of the AC power becomes a second reference value to detect the phase difference, and by changing one or both of the first and second reference values, one or both of the first and second phase values are changed.

3. The wireless power feeder according to claim 1, wherein the phase detection circuit converts one or both of voltage and current components of the AC power into a signal having a saw-tooth waveform for detection of the phase difference.

4. The wireless power feeder according to claim 1, further comprising: an exciting coil that is magnetically coupled to the feeding coil and feeds AC power fed from the power transmission control circuit to the feeding coil, wherein
    the power transmission control circuit includes first and second current paths and makes first and second switches connected in series respectively to the first and second current paths alternately conductive to feed the AC power to the exciting coil.

5. The wireless power feeder according to claim 1, further comprising a detection coil that generates inductive current using a magnetic field generated by AC current, wherein
    the phase detection circuit measures a phase of the inductive current flowing in the detection coil to achieve measurement of the current phase of the AC power.

6. The wireless power feeder according to claim 5, wherein the detection coil is a coil that generates the inductive current using a magnetic field generated by the AC current flowing in the feeding coil.

7. The wireless power feeder according to claim 1, wherein the power transmission control circuit causes the feeding coil to which no capacitor is connected in series or in parallel, to feed the AC power to the receiving coil.

8. The wireless power feeder according to claim 1, wherein the feeding coil does not form, together with circuit elements on the power feeding side, a resonance circuit having a resonance point corresponding to a resonance frequency of the receiving coil.

9. The wireless power feeder according to claim 1, wherein no capacitor is inserted in series or in parallel to the feeding coil.

10. The wireless power feeder according to claim 1, wherein the feeding coil is connected to a capacitor and forms a circuit which resonates at a resonance frequency of the receiving coil.

11. A wireless power transmission system comprising:
the wireless power feeder as claimed in claim 1;
the receiving coil; and
a loading coil that is magnetically coupled to the receiving coil and receives power to be received by the receiving coil from the feeding coil.

12. The wireless power transmission system according to claim 11, wherein the receiving coil is connected to a capacitor and form a circuit which resonates at a resonance frequency of the feeding coil.

13. A table with wireless power feeding function comprising the wireless power feeder as claimed in claim 1, wherein the feeding coil is provided on a rear surface of the table or incorporated inside the table.

14. A table lamp with wireless power receiving function that receives, using a receiving coil, AC power transmitted from the table as claimed in claim 13 by wireless, comprising:
a receiving coil circuit that includes the receiving coil and a capacitor; and
a loading circuit that includes a loading coil that is magnetically coupled to the receiving coil to receive the AC power from the receiving coil and a lamp that receives power from the loading coil, wherein
when the lamp is placed on the table, the receiving coil receives the AC power fed from the feeding coil provided in the table to turn on the lamp.

* * * * *